(12) United States Patent
Nishino et al.

(10) Patent No.: US 8,848,154 B2
(45) Date of Patent: Sep. 30, 2014

(54) METHOD OF MANUFACTURING A DISPLAY DEVICE AND INTERMEDIATE PRODUCT USED THEREFORE

(75) Inventors: Tomonori Nishino, Mobara (JP); Hirotaka Imayama, Mobara (JP)

(73) Assignee: Japan Display Inc., Tokyo (JP)

( * ) Notice: Subject to any disclaimer, the term of this patent is extended or adjusted under 35 U.S.C. 154(b) by 298 days.

(21) Appl. No.: 13/430,753

(22) Filed: Mar. 27, 2012

(65) Prior Publication Data

US 2012/0257157 A1 Oct. 11, 2012

(30) Foreign Application Priority Data

Apr. 5, 2011 (JP) ................................. 2011-083878

(51) Int. Cl.
*G02F 1/1339* (2006.01)
*G02F 1/1341* (2006.01)
(52) U.S. Cl.
CPC ............ *G02F 1/1339* (2013.01); *G02F 1/1341* (2013.01)
USPC .......................................... 349/153; 349/190
(58) Field of Classification Search
CPC .............................. G02F 1/1339; G02F 1/1341
USPC ................................................. 349/153, 190
See application file for complete search history.

(56) References Cited

U.S. PATENT DOCUMENTS

2003/0107699 A1* 6/2003 Jung et al. ...................... 349/153
2013/0235319 A1* 9/2013 Tsuchiya et al. ............... 349/153

FOREIGN PATENT DOCUMENTS

JP 2009-73711 4/2009

* cited by examiner

*Primary Examiner* — Thanh-Nhan P Nguyen
(74) *Attorney, Agent, or Firm* — Antonelli, Terry, Stout & Kraus, LLP.

(57) ABSTRACT

An intermediate product where a pair of inorganic substrates facing each other in an opposed manner is provided and a sealed space is formed by an organic sealing member between the pair of inorganic substrates is prepared. The inorganic substrates are cut outside the sealed space. A circuit for an image display is formed on at least one of oppositely facing surfaces of the inorganic substrates in the sealed space. The intermediate product includes a flow passage which is defined by a surface of at least one of the inorganic substrates and the organic sealing member outside the sealed space. The step of cutting the inorganic substrates includes forming a groove by allowing an etchant for an inorganic material to flow into the flow passage and by etching the surface of at least one of the inorganic substrates along the flow passage.

23 Claims, 15 Drawing Sheets

METHOD OF MANUFACTURING A DISPLAY DEVICE AND INTERMEDIATE PRODUCT USED THEREFORE

CROSS-REFERENCE TO RELATED APPLICATION

The present application claims priority from Japanese application JP2011-083878 filed on Apr. 5, 2011, the contents of which are hereby incorporated by reference into this application.

BACKGROUND OF THE INVENTION

1. Field of the Invention

The present invention relates to a method of manufacturing a display device and an intermediate product used therefore.

2. Description of the Related Art

As a method of manufacturing a liquid crystal display panel, there has been known a method which uses large-sized mother glass substrates, wherein a sealing member which seals liquid crystal in each individual product is arranged between a pair of mother glass substrates. There has been proposed a technique where mother glass is made thin by chemical etching (JP 2009-73711 A). There has been also proposed a technique where a sealing material is provided to a peripheral portion of a pair of mother glass substrates. In an operation where the mother glass substrate is made thin by chemical etching, the sealing material prevents the intrusion of an etchant into a space between the pair of mother glass substrates thus protecting a sealing member of individual products.

Conventionally, due to the presence of the sealing member, etching of mother glass at an edge portion is difficult and hence, the difference in sheet thickness occurs whereby the presence of the sealing member adversely influences a cutting step which follows an etching step.

SUMMARY OF THE INVENTION

It is an object of the present invention to provide a method of manufacturing a display device where a cutting step can be favorably performed and an intermediate product used therefore.

(1) According to one aspect of the present invention, there is provided a method of manufacturing a display device, the method including the steps of: preparing an intermediate product where a pair of inorganic substrates which faces each other in an opposed manner is provided and a sealed space is formed by an organic sealing member between the pair of inorganic substrates; and cutting the pair of inorganic substrates outside the sealed space, wherein a circuit for an image display is formed on at least one of oppositely facing surfaces of the pair of inorganic substrates in the sealed space, the intermediate product includes a flow passage which is defined by a surface of at least one of the pair of inorganic substrates and the organic sealing member outside the sealed space, and the step of cutting the pair of inorganic substrates includes forming a groove by allowing an etchant for an inorganic material to flow into the flow passage and by etching the surface of at least one of the pair of inorganic substrates along the flow passage. According to the present invention, the groove is formed on the inorganic substrate and hence, the inorganic substrate can be favorably cut along the groove.

(2) In the method of manufacturing a display device having the constitution (1), the forming of the groove may be performed by immersing the intermediate product in the etchant, and surfaces of the pair of inorganic substrates which are directed in the directions opposite to each other may be etched by the etchant thus making the pair of inorganic substrates thin.

(3) In the method of manufacturing a display device having the constitution (1), plural sealed spaces may be formed by the organic sealing member.

(4) In the method of manufacturing a display device having the constitution (1), the organic sealing member may be provided between the pair of inorganic substrates.

(5) In the method of manufacturing a display device having the constitution (1), the organic sealing member may include an interposed sealing member provided between the pair of inorganic substrates, and a cover sealing member which is provided on edge surfaces of the pair of inorganic substrates.

(6) In the method of manufacturing a display device having the constitution (1), the organic sealing member may include an inner sealing member arranged adjacent to the sealed space, and an outer sealing member which is arranged outside the sealed space surrounded by the inner sealing member and is separated from the inner sealing member in a spaced apart manner.

(7) In the method of manufacturing a display device having the constitution (1), the organic sealing member may include a pair of full close contact portions which is arranged in a spaced apart manner from each other such that the pair of full close contact portions is brought into close contact with both of the pair of inorganic substrates, and a half close contact portion which is arranged between the pair of full close contact portions and is brought into close contact with the other inorganic substrate of the pair of inorganic substrates while avoiding a contact with one inorganic substrate of the pair of inorganic substrates.

(8) In the method of manufacturing a display device having the constitution (1), the organic sealing member may include a portion of an organic film formed of at least one layer which is formed between the pair of inorganic substrates such that the organic film extends to an outer side from an inner side of the sealed space.

(9) In the method of manufacturing a display device having the constitution (1), the organic sealing member may include a portion of an organic film formed of at least one layer which is formed between the pair of inorganic substrates such that the organic film extends to an outer side from an inner side of the sealed space, and an adhesive portion which is laminated to the portion of the organic film formed of at least one layer and adheres the pair of inorganic substrates to each other.

(10) In the method of manufacturing a display device having the constitution (1), the organic sealing member may include a portion of a first organic film formed of at least one layer which is laminated to one inorganic substrate, and a portion of a second organic film formed of at least one layer which is laminated to the other inorganic substrate, and the portion of the first organic film formed of at least one layer and the portion of the second organic film formed of at least one layer may be bonded to each other.

(11) In the method of manufacturing a display device having the constitution (1), the organic sealing member may include a portion of a first organic film formed of at least one layer which is laminated to one inorganic substrate, a portion of a second organic film formed of at least one layer which is laminated to the other inorganic substrate, and an adhesive portion, and the portion of the first organic film formed of at least one layer and the portion of the second organic film formed of at least one layer may be bonded to each other by way of the adhesive portion.

(12) In the method of manufacturing a display device having the constitution (1), in the step of cutting the pair of inorganic substrates, a surface of the inorganic substrate opposite to the surface on which the groove is formed may be scribed along the groove.

(13) In the method of manufacturing a display device having the constitution (1), a slit may be formed in at least one of the pair of inorganic substrates in a penetrating manner by advancing the growth of the groove by the etching.

(14) In the method of manufacturing a display device having the constitution (13), at least one of the pair of inorganic substrates may be cut by forming the slit such that the slit surrounds the sealed space.

(15) In the method of manufacturing a display device having the constitution (14), both of the pair of inorganic substrates may be cut by the etching.

(16) In the method of manufacturing a display device having the constitution (1), a product sealing member which surrounds a space to be formed into a product may be provided in the sealed space between the pair of inorganic substrates, and the circuit may be arranged in the space to be formed into the product.

(17) In the method of manufacturing a display device having the constitution (16), in the space formed into the product, liquid crystal may be sealed by the product sealing member.

(18) In the method of manufacturing a display device having the constitution (16), an opening for filling liquid crystal into the space to be formed into the product may be formed in the product sealing member.

(19) In the method of manufacturing a display device having the constitution (1), the sealed space may be filled with liquid crystal.

(20) In the method of manufacturing a display device having the constitution (1), the organic sealing member may include a partition portion which divides the sealed space into plural divided sealed spaces.

(21) In the method of manufacturing a display device having the constitution (20), the organic sealing member may be formed in a state where the flow passage avoids the partition portion.

(22) In the method of manufacturing a display device having the constitution (20), the organic sealing member may be formed in a state where the flow passage passes the partition portion.

(23) In the method of manufacturing a display device having the constitution (22), in the partition portion, the flow passage may be formed such that the flow passage is defined by the surface of only one of the pair of inorganic substrates and the organic sealing member, and in an area which surrounds the whole sealed space, the flow passage may be defined by the surfaces of both of the pair of inorganic substrates and the organic sealing member.

(24) The present invention is also directed to an intermediate product for manufacturing a display device including: a pair of inorganic substrates which faces each other in an opposed manner; and an organic sealing member by which a sealed space is formed between the pair of inorganic substrates, wherein a circuit for an image display is formed on at least one of oppositely facing surfaces of the pair of inorganic substrates in the sealed space, and a flow passage which is defined by a surface of at least one of the pair of inorganic substrates and the organic sealing member is formed outside the sealed space. According to the present invention, a groove can be formed on the inorganic substrate by allowing an etchant to flow into the flow passage and hence, the inorganic substrate can be favorably cut along the groove.

(25) In the intermediate product for manufacturing a display device having the constitution (24), plural sealed spaces may be formed by the organic sealing member.

(26) In the intermediate product for manufacturing a display device having the constitution (24), the organic sealing member may be provided between the pair of inorganic substrates.

(27) In the intermediate product for manufacturing a display device having the constitution (24), the organic sealing member may include an interposed sealing member provided between the pair of inorganic substrates, and a cover sealing member which is provided on edge surfaces of the pair of inorganic substrates.

(28) In the intermediate product for manufacturing a display device having the constitution (24), the organic sealing member may include an inner sealing member arranged adjacent to the sealed space, and an outer sealing member which is arranged outside the sealed space surrounded by the inner sealing member and is separated from the inner sealing member in a spaced apart manner.

(29) In the intermediate product for manufacturing a display device having the constitution (24), the organic sealing member may include a pair of full close contact portions which is arranged in a spaced apart manner from each other such that the pair of full close contact portions is brought into close contact with both of the pair of inorganic substrates, and a half close contact portion which is arranged between the pair of full close contact portions and is brought into close contact with the other inorganic substrate of the pair of inorganic substrates while avoiding a contact with one inorganic substrate of the pair of inorganic substrates.

(30) In the intermediate product for manufacturing a display device having the constitution (24), the organic sealing member may include a portion of an organic film formed of at least one layer which is formed between the pair of inorganic substrates such that the organic film extends to an outer side from an inner side of the sealed space.

(31) In the intermediate product for manufacturing a display device having the constitution (24), the organic sealing member may include a portion of an organic film formed of at least one layer which is formed between the pair of inorganic substrates such that the organic film extends to an outer side from an inner side of the sealed space, and an adhesive portion which is laminated to the portion of the organic film formed of at least one layer and adheres the pair of inorganic substrates to each other.

(32) In the intermediate product for manufacturing a display device having the constitution (24), the organic sealing member may include a portion of a first organic film formed of at least one layer which is laminated to one inorganic substrate, and a portion of a second organic film formed of at least one layer which is laminated to the other inorganic substrate, and the portion of the first organic film formed of at least one layer and the portion of the second organic film formed of at least one layer may be bonded to each other.

(33) In the intermediate product for manufacturing a display device having the constitution (24), the organic sealing member may include a portion of a first organic film formed of at least one layer which is laminated to one inorganic substrate, a portion of a second organic film formed of at least one layer which is laminated to the other inorganic substrate, and an adhesive portion, and the portion of the first organic film formed of at least one layer and the portion of the second organic film formed of at least one layer may be bonded to each other by way of the adhesive portion.

(34) In the intermediate product for manufacturing a display device having the constitution (24), a product sealing member which surrounds a space to be formed into a product may be provided in the sealed space between the pair of inorganic substrates, and the circuit may be arranged in the space to be formed into the product.

(35) In the intermediate product for manufacturing a display device having the constitution (34), in the space formed into the product, liquid crystal may be sealed by the product sealing member.

(36) In the intermediate product for manufacturing a display device having the constitution (34), an opening for filling liquid crystal into the space to be formed into the product may be formed in the product sealing member.

(37) In the intermediate product for manufacturing a display device having the constitution (24), the sealed space may be filled with liquid crystal.

(38) In the intermediate product for manufacturing a display device having the constitution (24), the organic sealing member may include a partition portion which divides the sealed space into plural divided sealed spaces.

(39) In the intermediate product for manufacturing a display device having the constitution (38), the organic sealing member may be formed in a state where the flow passage avoids the partition portion.

(40) In the intermediate product for manufacturing a display device having the constitution (38), the organic sealing member may be formed in a state where the flow passage passes the partition portion.

(41) In the intermediate product for manufacturing a display device having the constitution (40), in the partition portion, the flow passage may be formed such that the flow passage is defined by the surface of only one of the pair of inorganic substrates and the organic sealing member, and in an area which surrounds the whole sealed space, the flow passage may be defined by the surfaces of both of the pair of inorganic substrates and the organic sealing member.

(42) In the intermediate product for manufacturing a display device having any one of the constitutions (24) to (41), the pair of inorganic substrates may differ in thickness.

DETAILED DESCRIPTION OF THE INVENTION

Hereinafter, embodiments of the present invention are explained in conjunction with drawings. A method of manufacturing a display device according to the embodiments includes a step of preparing an intermediate product. The intermediate product is a product which is obtained in the midst of a manufacturing process. A final product of the manufacturing process is a display device. Although the display device manufactured in this embodiment is a liquid crystal display device, the present invention is also applicable to other display devices such as an organic electroluminescence device.

First Embodiment

Figure 1:
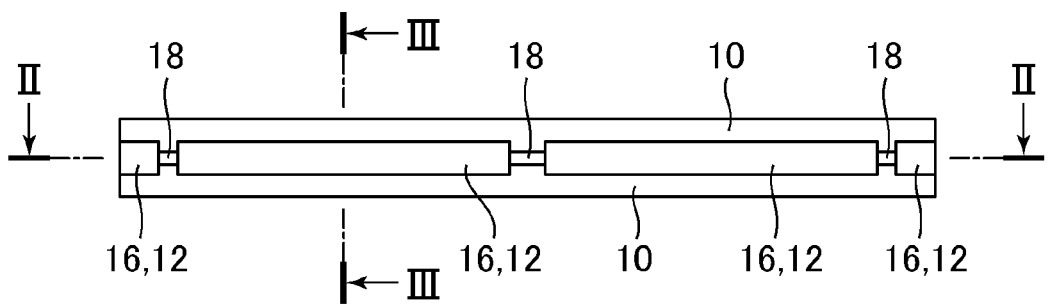
FIG. 1 is a side view showing an intermediate product according to a first embodiment.
Figure 2:
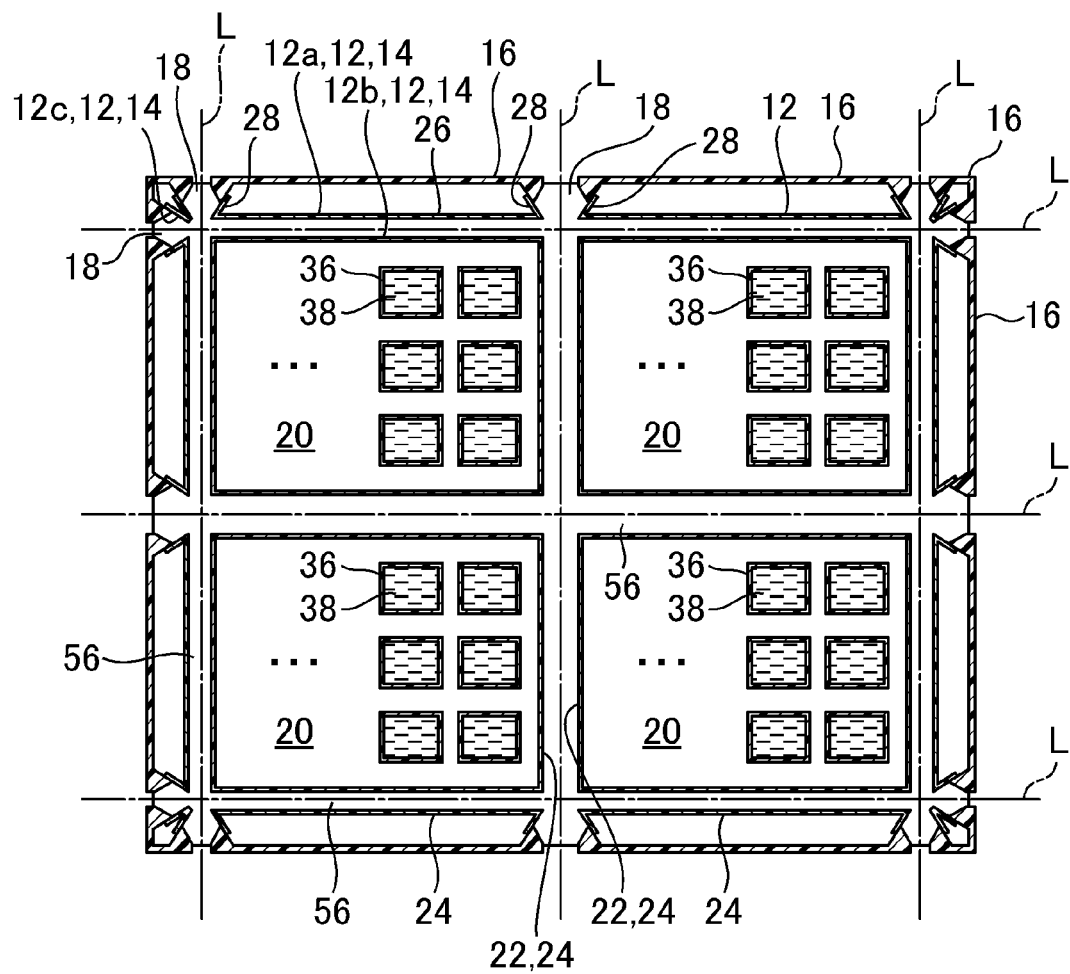
FIG. 2 is a cross-sectional view of the intermediate product shown in FIG. 1 taken along a line II-II.
Figure 3:
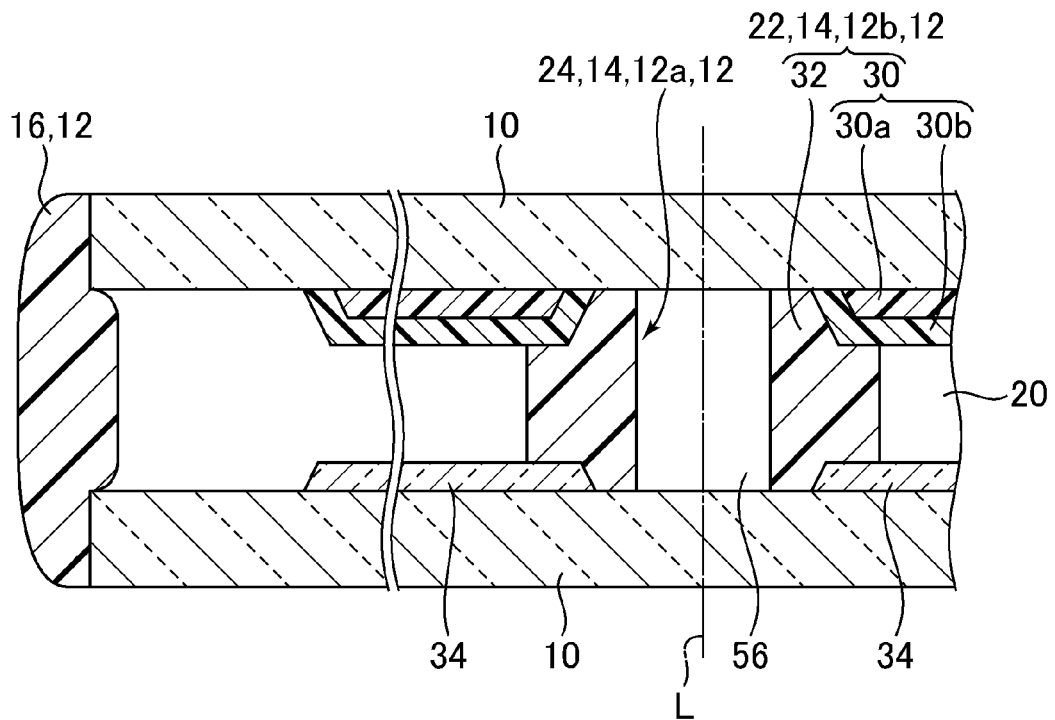
FIG. 3 is an enlarged cross-sectional view of the intermediate product shown in FIG. 1 taken along a line III-III.

FIG. 1 is a side view showing an intermediate product according to the first embodiment. FIG. 2 is a cross-sectional view of the intermediate product shown in FIG. 1 taken along a line II-II. FIG. 3 is an enlarged cross-sectional view of the intermediate product shown in FIG. 1 taken along a line III-III.

The intermediate product includes a pair of inorganic substrates 10 (for example, glass substrates). Each inorganic substrate 10 has a rectangular planar shape. The pair of inorganic substrates 10 constitutes mother substrates respectively and the mother substrates are cut along cutting lines L corresponding to individual final products. The pair of inorganic substrates 10 is arranged to face each other in an opposed manner with a distance therebetween. Organic sealing members 12 made of a resin or the like are arranged between the pair of inorganic substrates 10.

The organic sealing member 12 is classified into interposed sealing members 14 and cover sealing members 16 depending on positions thereof. The interposed sealing members 14 are arranged between the pair of inorganic substrates 10 (to be more specific, oppositely facing surfaces). The interposed sealing members 14 are arranged on oppositely facing surfaces of the pair of inorganic substrates 10 while avoiding peripheries of the inorganic substrates 10 so that the interposed sealing members 14 do not project from the inorganic substrates 10. The interposed sealing members 14 are brought into contact with or brought into close contact with the oppositely facing surfaces of the pair of inorganic substrates 10. On the other hand, the cover sealing members 16 are arranged on edge surfaces (outer peripheral surfaces raised from peripheries of oppositely facing surface) of the pair of inorganic substrates 10. The cover sealing members 16 are configured to close a space formed between the pair of inorganic substrates 10 except for portions of the space. The space formed between the pair of inorganic substrates 10 is communicated with the outside at regions where the cover sealing members 16 are not arranged. That is, the cover sealing members 16 are formed so as to have openings 18. The cover sealing members 16 may enter the space formed between the pair of inorganic substrates 10 or may be brought into contact with (brought into close contact with) oppositely facing surfaces of the pair of inorganic substrates 10 (for example, edge portions of the inorganic substrates 10).

The organic sealing members 12 form sealed spaces 20 by partially surrounding the space formed between the pair of inorganic substrates 10. In an example shown in FIG. 2, plural sealed spaces 20 are formed by the organic sealing members 12 (interposed sealing members 14). In this embodiment, the sealed space 20 is a space which contains a part which becomes a final product.

From a viewpoint of functions which the organic sealing member 12 performs with respect to the sealed space 20, the organic sealing member 12 includes an inner sealing member 22 and an outer sealing member 24. The inner sealing member 22 is provided for defining the sealed space 20 and is arranged adjacent to the sealed space 20. The outer sealing member 24 is arranged in a spaced-apart manner from the inner sealing member 22 which surrounds the sealed space 20 and is arranged outside the sealed space 20 in a separated manner. However, as shown in FIG. 2, the plural sealed spaces 20 are formed and hence, the organic sealing members 12 which constitute the inner sealing members 22 arranged adjacent to each other and surround the sealed spaces 20 arranged adjacent to each other respectively also constitute the outer sealing members 24 mutually. That is, one of the inner sealing members 22 arranged adjacent to each other also constitutes the outer sealing member 24 with respect to the other inner sealing member 22. In other words, the organic sealing member 12 which constitutes the inner sealing member 22 with respect to one sealed space 20 also constitutes the outer sealing member 24 since the organic sealing member 12 does not define the sealed space 20 with respect to the neighboring sealed space 20. To the contrary, the organic sealing member 12 which is away from a portion of the inner sealing member 22 closest to an edge portion of the inorganic substrate 10 in the direction toward the periphery of the inorganic substrate 10 does not define the sealed space 20 which contains a part which becomes a final product and hence, such an organic sealing member 12 constitutes the outer sealing member 24 but does not constitute the inner sealing member 22.

The organic sealing member 12a which constitutes the outer sealing member 24 but does not constitute the inner sealing member 22 includes a first portion 26 which extends along an organic sealing member 12b which constitutes the inner sealing member 22, and second portions 28 which are folded at an angle exceeding 90 degrees and extend from the first portion 26 in the outward direction (in the direction away from the inner sealing member 22). The second portions 28 arranged adjacent to each other of the organic sealing members 12 arranged adjacent to each other are arranged with a distance therebetween, and the distance gradually increases in the outward direction. The cover sealing member 16 is provided in contact (close contact) with distal end portions (for example, outer sides of the distal end portions) of the second portions 28. In the example shown in FIG. 2, although there is a space which is sealed by the cover sealing member 16 and the second portions 28 at an edge portion of the inorganic substrates 10, this space does not constitute the sealed space 20 defined in the present invention. With respect to the organic sealing members 12 which are arranged adjacent to each other, the cover sealing members 16 which are arranged adjacent to each other and are brought into contact (close contact) with the second portions 28 arranged adjacent to each other respectively are arranged with a distance therebetween, and the distance gradually decreases in the outward direction. The opening 18 is formed between the cover sealing members 16 arranged adjacent to each other. The pair of cover sealing members 16 which is positioned on both sides of the opening 18 is formed such that the distance between the cover sealing members 16 gradually decreases in the outward direction.

An organic sealing member 12c having a V bent shape is arranged at a corner portion of the rectangular inorganic substrate 10 such that both ends of the organic sealing member 12c are directed in the direction toward a corner of the inorganic substrate 10. Since the V-shaped organic sealing member 12c is irrelevant to the sealed space 20, the organic sealing member 12c corresponds to neither the inner sealing member 22 nor the outer sealing member 24. The cover sealing member 16 is also brought into close contact with both distal end portions (for example, an outer side of the distal end portions) of the V-shaped organic sealing member 12c, and a sealed space is formed by these parts. However, this space is not also the sealed space 20 defined in the present invention. In the example shown in FIG. 2, a portion ranging from the distal end to a bent portion of the V-shaped organic sealing member 12c and the above-mentioned second portion 28 of the organic sealing member 12a are arranged adjacent to each other with a distance therebetween, and the distance gradually increases in the outward direction of the inorganic substrate 10. The cover sealing member 16 arranged at a corner portion of the inorganic substrate 10 (brought into contact with the V-shaped organic sealing member 12c) and the cover sealing members 16 arranged adjacent to the above-mentioned cover sealing member 16 (brought into contact with the second portion 28) are arranged with a distance therebetween, and the distance gradually decreases in the outward direction. That is, the pair of cover sealing members 16 positioned on both sides of the opening 18 is formed such that the distance between the cover sealing members 16 gradually decreases in the outward direction.

As shown in FIG. 3, between the pair of inorganic substrates 10, organic films 30 each formed of one layer or plural layers are formed such that the organic film 30 extends to an outer side (including a position where the organic sealing member 12b is arranged) from an inner side of the sealed space 20. For example, to the inorganic substrate 10 which constitutes a color filter substrate, an organic film 30a which constitutes a black matrix and an organic film 30b which constitutes an overcoat layer are laminated. The pair of inorganic substrates 10 is adhered to each other by laminating adhesive portions 32 to these organic films 30. The organic sealing member 12 is formed including portions of these respective organic films 30 and the adhesive portion 32. That is, the organic sealing member 12 includes a portion of the organic film 30 formed of one layer or plural layers. In the example shown in FIG. 3, an inorganic film 34 is formed on the inorganic substrate 10 on a lower side.

As shown in FIG. 2, between the pair of inorganic substrates 10, product sealing members 36 each of which surrounds a space to be formed into a product are provided in the sealing space 20. The plural product sealing members 36 are arranged in one sealed space 20. Liquid crystal 38 is sealed in the space to be formed into a product by the product sealing member 36.

Figure 4:
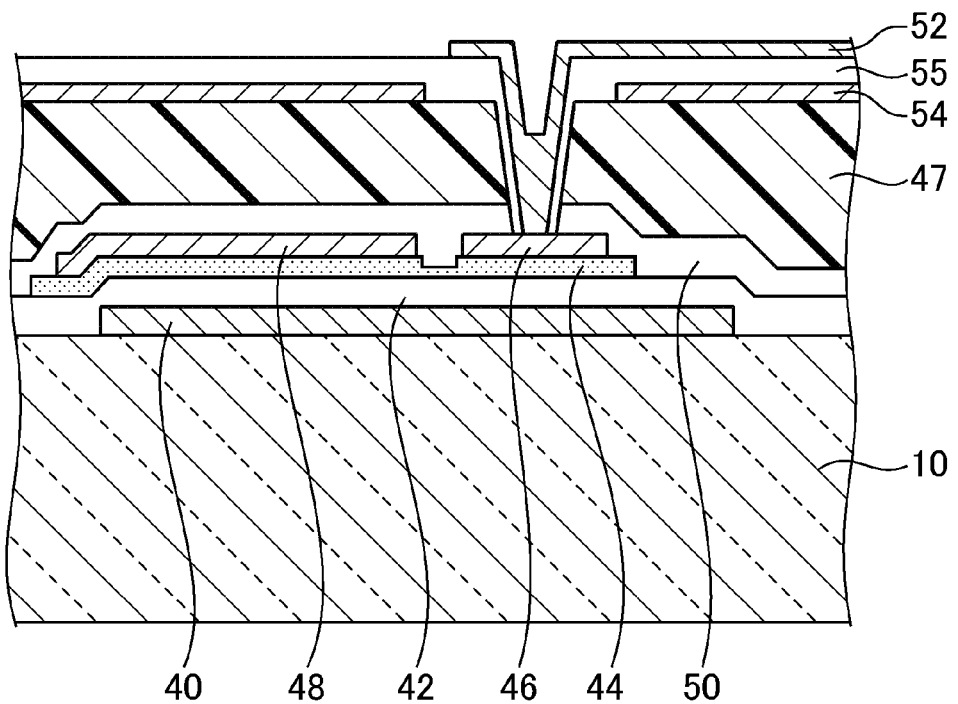
FIG. 4 is an enlarged view showing a part of a cross section of one inorganic substrate.

FIG. 4 is an enlarged view showing a part of a cross section of one inorganic substrate 10. Thin film transistors are formed on the inorganic substrate 10. That is, the inorganic substrate 10 is a TFT (Thin Film Transistor) substrate. The thin film transistor is a switch for controlling driving of the liquid crystal 38 (see FIG. 2). The thin film transistor is a bottom gate type transistor where a gate electrode 40 to which a scanning voltage for a control is applied is arranged on a lower side of the transistor. On the inorganic substrate 10, a gate electrode 40 which is made of an inorganic material (semiconductor oxide such as $SiO_2$ or semiconductor nitride such as SiN) is formed. A gate insulation film 42 is formed so as to cover the gate electrode 40. A semiconductor layer 44 is formed over the gate insulation film 42. A source electrode 46 and a drain electrode 48 are formed over the semiconductor layer 44. A protective insulation layer 50 made of an inorganic material (semiconductor oxide such as $SiO_2$ or semiconductor nitride such as SiN) is formed so as to cover the source electrode 46, the drain electrode 48 and the semiconductor layer 44. The moisture contamination of the semiconductor layer is prevented by the protective insulation layer 50. The inorganic film 34 shown in FIG. 3 is constituted of the gate insulation film 42 and the protective insulation layer 50.

When a gate voltage is applied to the gate electrode 40, the resistance of the semiconductor layer 44 between the drain electrode 48 to which a video signal voltage is applied and the source electrode 46 is lowered so that an electric field is generated between a pixel electrode 52 which is connected to the source electrode 46 and a common electrode 54 to which a common voltage is applied and the electric field is applied to the liquid crystal 38 whereby transmissivity of the liquid crystal 38 is changed thus allowing a display device to perform a display. A drive method of liquid crystal according to this embodiment is an IPS (In Plane Switching) method.

An organic insulation film 47 is arranged above the thin film transistor (over the protective insulation layer 50). The common electrode 54 is formed over the organic insulation film 47. An interlayer insulation film 55 is formed over the common electrode 54. The interlayer insulation film 55 is formed of an insulation film made of an inorganic material such as SiN. Further, the pixel electrode 52 is formed over the interlayer insulation film 55. The liquid crystal 38 not shown in the drawing is arranged over the pixel electrode 52 (see FIG. 2).

The circuit explained above is a circuit for an image display. The circuit is formed over at least one of oppositely facing surfaces of the pair of inorganic substrates 10 (the inorganic substrate 10 on a lower side in the example shown in FIG. 3). The circuit is arranged in the space to be formed into a product (a region surrounded by the product sealing member 36).

As shown in FIG. 3, outside the sealed space 20, a flow passage 56 is defined by a surface of at least one of the pair of inorganic substrates 10 and the organic sealing members 12. As shown in FIG. 2, the flow passage 56 passes between the sealed spaces 20 arranged adjacent to each other, and passes outside the sealing space 20, and is communicated with the outside. In the example shown in FIG. 2, the flow passages 56 which are integrally communicated with each other are formed. However, as a modification, plural flow passages 56 which are not communicated with each other may be formed.

As shown in FIG. 2, the flow passage 56 is communicated with the outside through the opening 18 which is formed by not providing the cover sealing member 16. The flow passage 56 is, at positions where the flow passages 56 surround the whole of the plural sealed spaces 20, formed between the organic sealing member 12b which constitutes the inner sealing member 22 and the organic sealing member 12a which constitutes the outer sealing member 24 but does not constitute the inner sealing member 22. The flow passage 56 is, between the sealed spaces 20 arranged adjacent to each other, formed between the pair of organic sealing members 12b which constitute the inner sealing members 22 for defining the sealed spaces 20 respectively and also constitute the outer sealing members 24 in view of the relative positional relationship. The flow passage 56 is also formed between the pair of organic sealing members 12a which constitutes the outer sealing members 24 arranged adjacent to each other but does not constitute the inner sealing members 22. Further, the flow passage 56 is also formed between the organic sealing member 12a which constitutes the outer sealing member 24 but does not constitute the inner sealing member 22 and the organic sealing member 12c which constitutes neither the inner sealing member 22 nor the outer sealing member 24. Still further, the flow passage 56 is also formed between the pair of cover sealing members 16 which sandwich the opening 18 therebetween.

An opposedly facing surface of the inorganic substrate 10 is exposed in the flow passage 56. To be more specific, an opposedly facing surface per se of a base material of the inorganic substrate 10 may be exposed or a surface of a layer made of an inorganic material formed on the base material of the inorganic substrate 10 may be exposed. In either case, a surface of at least one of inorganic substrates 10 which is exposed in the flow passage 56 is made of an inorganic material. The organic film 30 formed of one layer or plural layers which is formed over the inorganic substrate 10 (see FIG. 3) is formed while avoiding the flow passage 56. Besides the above-mentioned constitution, an organic material is not present between the inorganic substrate 10 and the flow passage 56.

Figure 5:
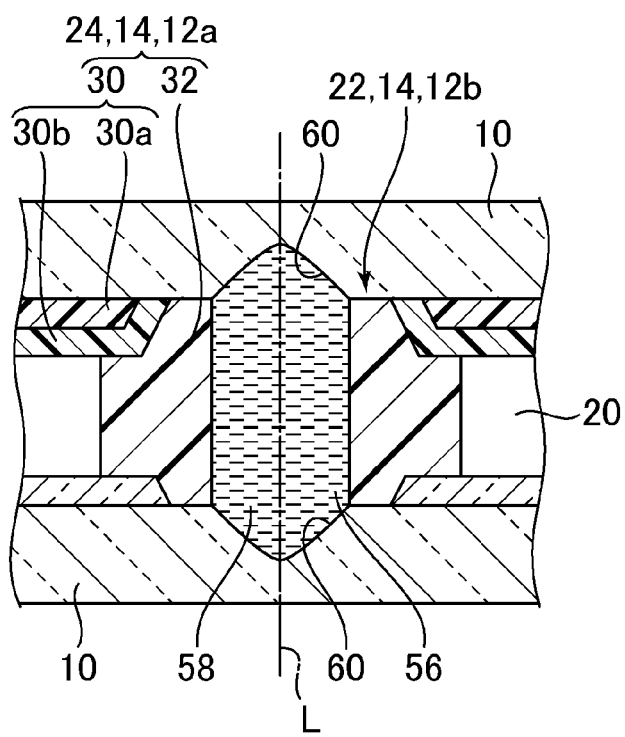
FIG. 5 is a view for explaining a method of manufacturing a display device according to the first embodiment.
Figure 6:
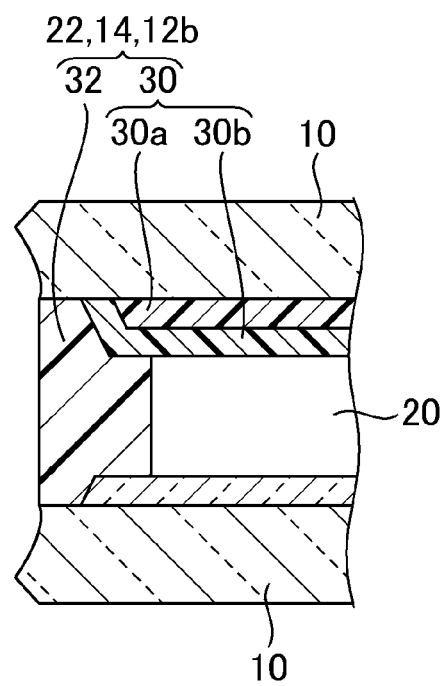
FIG. 6 is a view for explaining the method of manufacturing the display device according to the first embodiment.

FIG. 5 and FIG. 6 are views for explaining a method of manufacturing a display device according to this embodiment. The method of manufacturing a display device includes a step of cutting the pair of inorganic substrates 10 outside the sealed space 20.

To be more specific, as shown in FIG. 5, an etchant 58 for an inorganic material is made to flow through the flow passages 56. A surface of at least one of the pair of inorganic substrates 10 is etched by the etchant 58 along the flow passages 56 so that grooves 60 are formed. According to this embodiment, the grooves 60 can be formed on the inorganic substrate 10 by allowing the etchant 58 to flow into the flow passages 56 and hence, the inorganic substrate 10 can be favorably cut along these grooves 60.

The step of forming the grooves 60 can be simultaneously performed with a step of making an inorganic substrate 10 thin. For example, an intermediate product is immersed in the etchant 58. Accordingly, the etchant 58 is allowed to flow into the flow passages 56. With such an etchant 58, surfaces of the pair of inorganic substrates 10 which are directed toward sides opposite to each other are etched respectively so that the pair of inorganic substrates 10 becomes thin.

Next, a surface of the inorganic substrate 10 opposite to the surface on which the grooves 60 are formed is scribed along the grooves 60. Then, as shown in FIG. 6, the pair of inorganic substrates 10 is cut. That is, the pair of inorganic substrates 10 is cut out in a state where plural sealed spaces 20 (see FIG. 2) are sealed by the organic sealing member 12. Since plural spaces to be formed into products are sealed in the respective sealed spaces 20 by the product sealing members 36, these spaces are cut out for every product. A display device can be obtained in this manner.

[Modification]

Figure 7:
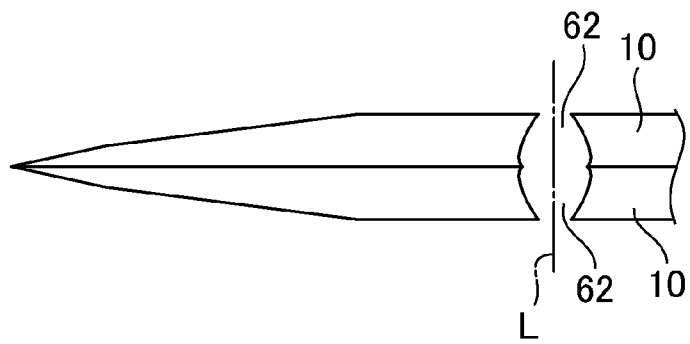
FIG. 7 is a view for explaining a method of manufacturing a display device according to a modification 1 of the first embodiment.

FIG. 7 is a view for explaining a method of manufacturing a display device according to a modification 1 of this embodiment. In this modification, both of a pair of inorganic substrates 10 are cut by advancing the growth of grooves. That is, a slit 62 is formed in the inorganic substrate 10 in a penetrating manner by etching. The slit 62 is formed so as to surround a sealed space 20 (see FIG. 2). With such an operation, scribing can be omitted. Further, it is possible to acquire a step omitting effect even when only one inorganic substrate 10 is cut by etching. The detail of other constitutions of this modification is exactly the same as the corresponding constitutions of the above-mentioned embodiment.

Figure 8:
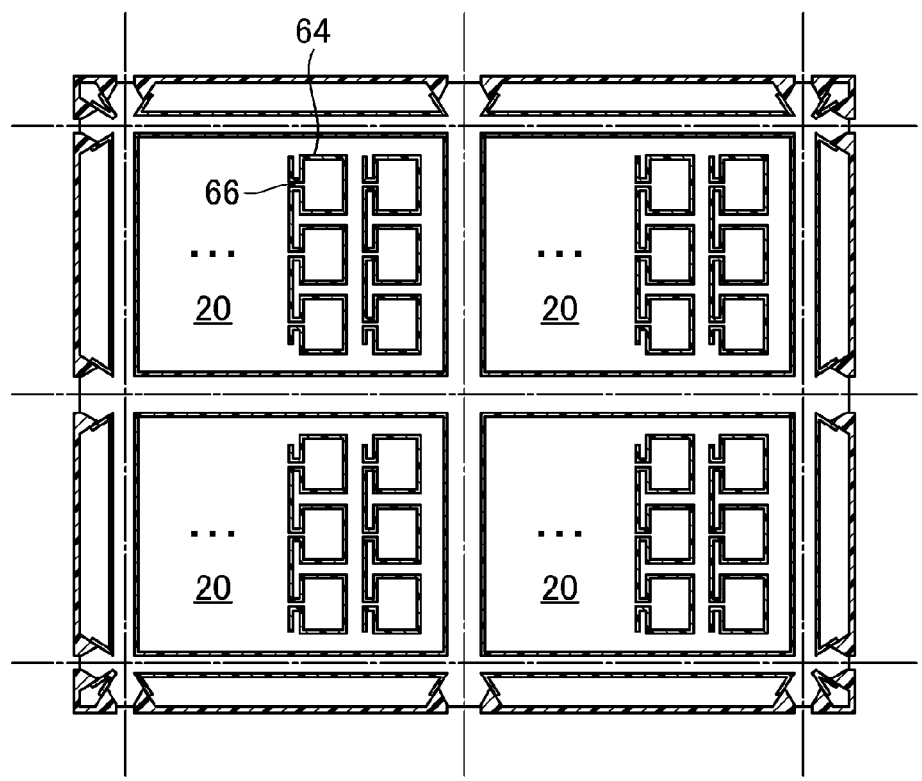
FIG. 8 is a view showing an intermediate product according to a modification 2 of the first embodiment.

FIG. 8 is a view showing an intermediate product according to a modification 2 of this embodiment. In this modification, an opening 66 for filling liquid crystal in a space to be formed into a product in a succeeding step is formed in a product sealing member 64. Accordingly, the inside of the product sealing member 64 is empty. That is, plural empty cells are arranged in a sealed space 20. The product sealing members 64 define plural empty cells continuously. A pair of inorganic substrates 10 is cut along the above-mentioned grooves 60 (see FIG. 5) and, thereafter, is cut out for every empty cell. Thereafter, the empty cell is filled with liquid crystal. Other contents of this modification correspond to the contents explained in conjunction with the above-mentioned embodiment.

Figure 9:
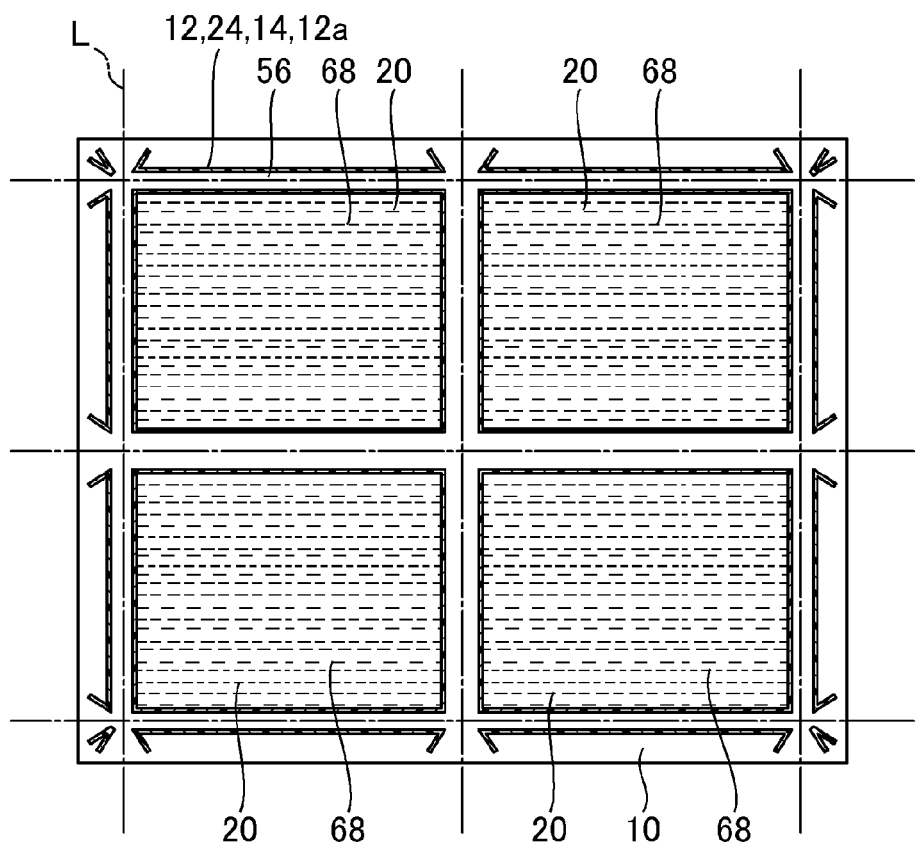
FIG. 9 is a view showing an intermediate product according to a modification 3 of the first embodiment.

FIG. 9 is a view showing an intermediate product according to a modification 3 of this embodiment. In this modification, a sealed space 20 is filled with liquid crystal 68. That is, product sealing members are not provided in the sealed space 20, and each sealed space 20 as a whole is used for producing one product. That is, a pair of inorganic substrates 10 which is cut out for every sealed space 20 becomes a product and hence, re-cutting is not performed. The contents of this modification are applicable to the above-mentioned embodiment. Further, in this modification, a cover sealing member 16 shown in FIG. 2 is omitted. An organic sealing member 12 which is arranged adjacent to a flow passage 56 and is positioned on a most end portion side of the pair of inorganic substrates 10 constitutes an interposed sealing member 14 and also constitutes an outer sealing member 24 which does not seal the sealed space 20. The contents of this modification are also applicable to the above-mentioned embodiment.

Figure 10:
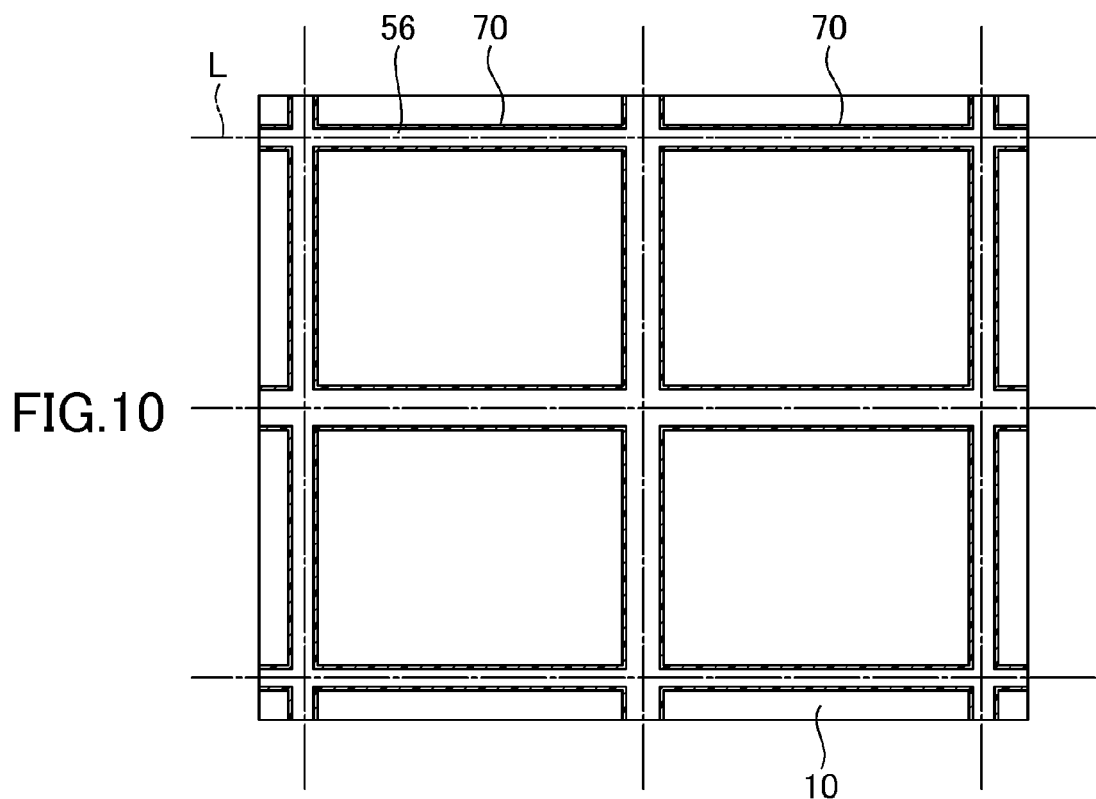
FIG. 10 is a view showing an intermediate product according to a modification 4 of the first embodiment.

FIG. 10 is a view showing an intermediate product according to a modification 4 of this embodiment. This modification differs from the modification 3 shown in FIG. 9 with respect to a shape of an organic sealing member 70 which constitutes an outer sealing member which is arranged adjacent to a flow passage 56 and is positioned on a most end portion side of a pair of inorganic substrates 10. That is, in the modification shown in FIG. 9, an organic sealing member 12a is arranged while avoiding peripheral portions of the pair of inorganic substrates 10. On the other hand, in the modification shown in FIG. 10, the organic sealing member 70 is arranged in a state where the organic sealing member 70 reaches peripheries of the pair of inorganic substrates 10. Other contents of this modification correspond to the contents explained in conjunction with the above-mentioned modification 3.

Figure 11:
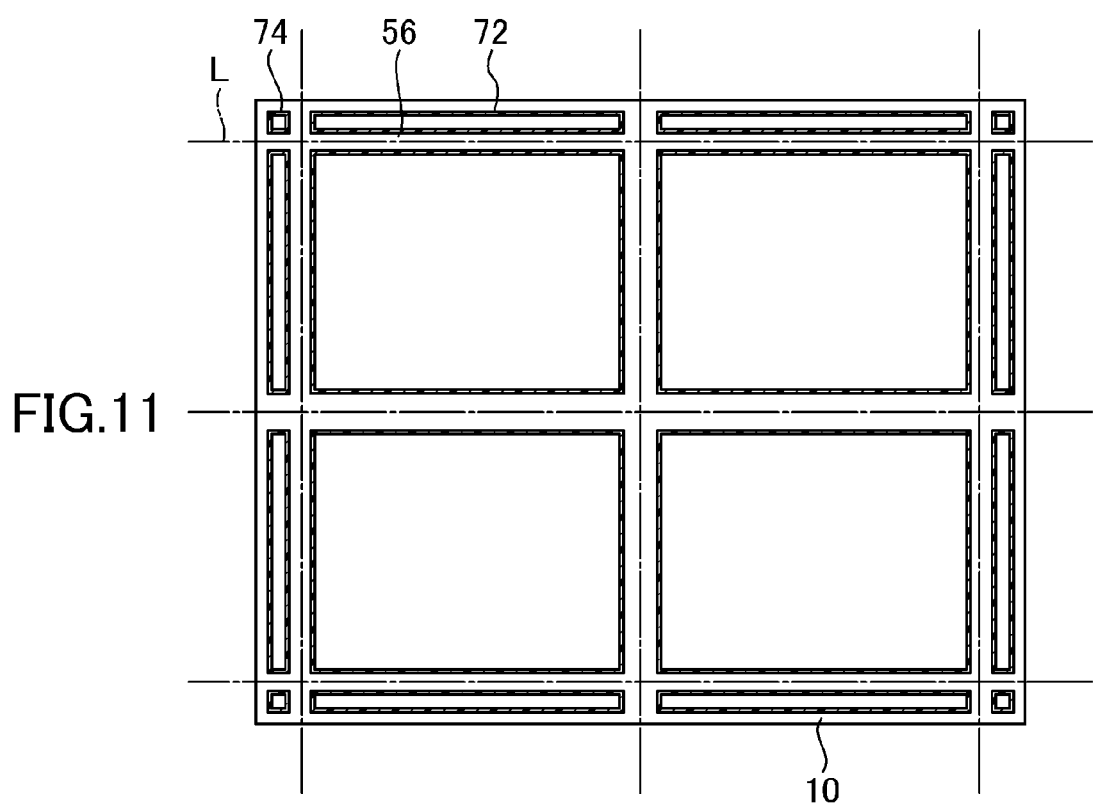
FIG. 11 is a view showing an intermediate product according to a modification 5 of the first embodiment.

FIG. 11 is a view showing an intermediate product according to a modification 5 of this embodiment. This modification differs from the modification 3 shown in FIG. 9 with respect to a shape of an organic sealing member 72 which constitutes an outer sealing member arranged on an outermost edge portion side of a pair of inorganic substrates 10. That is, different from the modification shown in FIG. 9, in the modification shown in FIG. 11, the organic sealing member 72 which constitutes the outer sealing member which is positioned on an outermost side is formed so as to surround a predetermined region. Further, an organic sealing member 74 which corresponds to neither an inner sealing member nor an outer sealing member is also formed so as to surround a predetermined region. Other contents of this modification correspond to the contents explained in conjunction with the above-mentioned modification 3.

Figure 12:
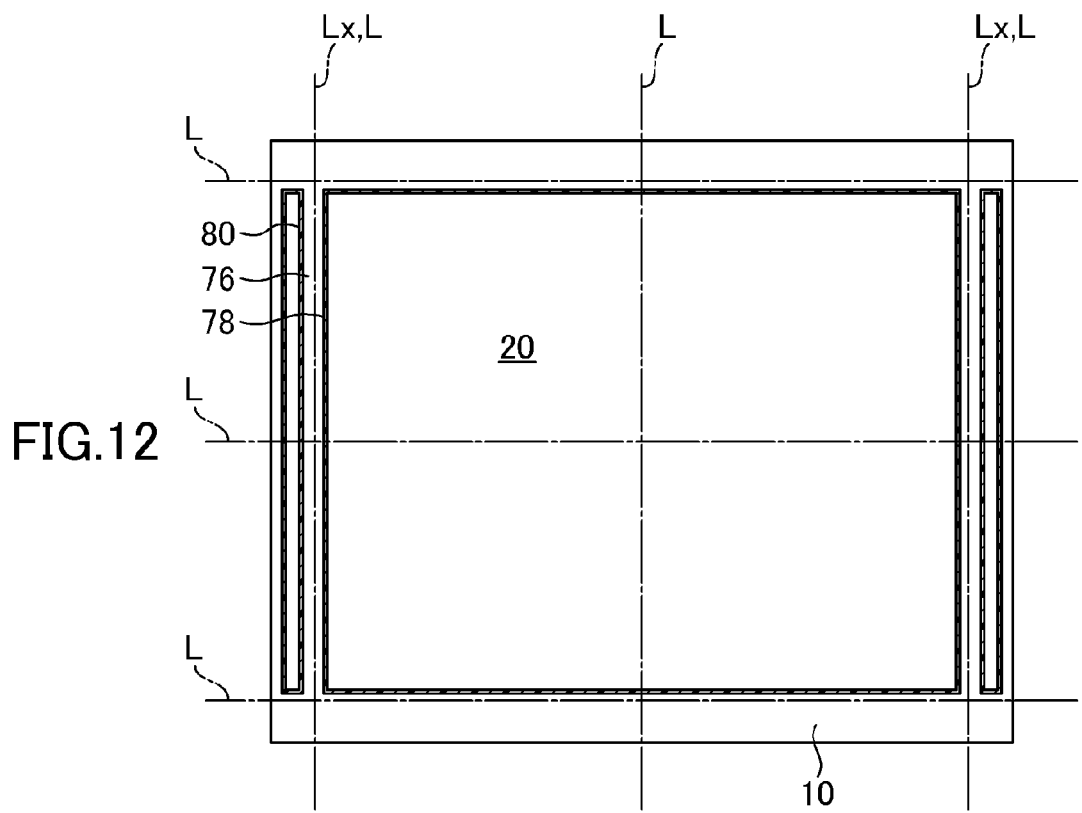
FIG. 12 is a view showing an intermediate product according to a modification 6 of the first embodiment.

FIG. 12 is a view showing an intermediate product according to a modification 6 of this embodiment. This modification differs from the above-mentioned embodiment with respect to a point that although inorganic substrates 10 are cut along plural cutting lines L, flow passages 76 are not formed along all cutting lines L. The flow passages 76 are formed along cutting lines $L_X$ excluding at least one cutting line from the plural cutting lines L. Further, the flow passage 76 is not formed such that the flow passage 76 extends from one end to the other end of the inorganic substrate 10. That is, the flow passage 76 is formed while avoiding an edge portion of the inorganic substrate 10. To be more specific, an inner sealing member 78 is formed while avoiding the edge portion of the inorganic substrate 10, and an outer sealing member 80 is also formed while avoiding the edge portion of the inorganic substrate 10. Accordingly, the flow passage 76 is formed only along a portion of the cutting line $L_X$. An etchant is made to flow into such a flow passage 76 so that a groove is formed only along the portion of the cutting line $L_X$. The inorganic substrate 10 is cut by scribing or the like along the groove in a region where the groove is formed. In a region where the groove is not formed, the inorganic substrate 10 is cut in accordance with a conventional method without a groove. In this modification, the cutting line L is designed to also traverse a sealed space 20. This point is also applicable to the above-mentioned embodiment or other modifications. Other contents of this modification correspond to the contents explained in conjunction with the above-mentioned embodiment.

Figure 13:
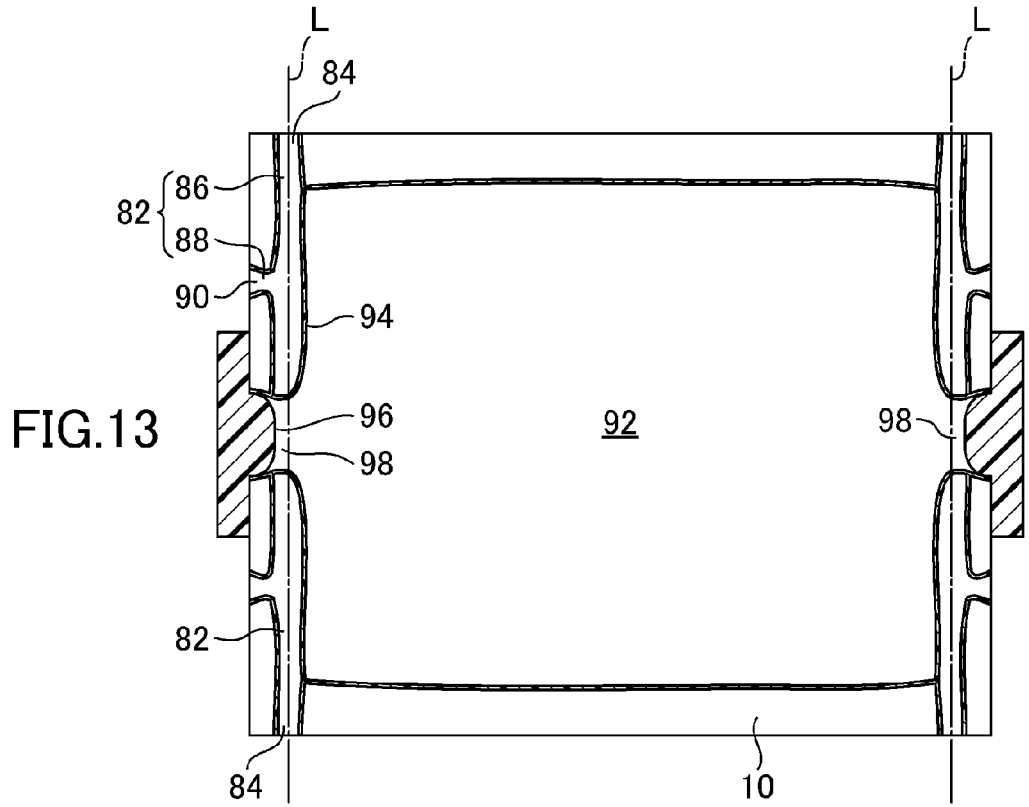
FIG. 13 is a view showing an intermediate product according to a modification 7 of the first embodiment.

FIG. 13 is a view showing an intermediate product according to a modification 7 of this embodiment. In this modification, plural flow passages 82 are formed along one cutting line L such that the flow passages 82 do not communicate with each other. The respective flow passages 82 have openings 84 on edges of an inorganic substrate 10 and communicate with the outside through the openings 84. In the modification shown in FIG. 13, a pair of flow passages 82 is formed along one cutting line L such that the openings 84 are directed in the directions opposite to each other. Each flow passage 82 includes a main passage 86 and a branched passage 88, and the main passage 86 extends along the cutting line L. The branched passage 88 extends in the direction which intersects the main passage 86 and has another opening 90 different from the opening 84 of the main passage 86. That is, one flow passage 82 includes the plural openings 84, 90 and is formed so as to be connected to all of these openings 84, 90.

A sealed space 92 is sealed by an inner sealing member 94 and a cover sealing member 96. That is, the inner sealing member 94 intermittently surrounds the sealed space 92 and forms an opening 98 of the sealed space 92. The opening 98 is closed by the cover sealing member 96. Due to the provision of the inner sealing member 94, the sealed space 92 has one or plural openings 98 (two openings 98 on left and right sides respectively in FIG. 13). The openings 98 are used as filling ports for liquid crystal. The flow passage 82 is formed so as not to pass the opening 98 of the sealed space 92. Accordingly, a groove is not formed in the opening 98 of the sealed space 92.

In applying the method according to this embodiment to the manufacture of display devices using this intermediate product, an etchant does not flow into the sealed space 92 closed by the cover sealing member 96, and a groove is formed along the flow passage 82. The groove is not formed in such a manner that the groove extends from one edge to the other edge of the inorganic substrate 10 along the cutting line L and is formed only along a portion of the zone. Even with such a groove, a cutting process becomes easy by making use of the groove. After the cutting process is finished, the cover sealing member 96 is removed, and liquid crystal is filled into the sealed space 92 from the opening 98 formed of a slit formed in the inner sealing member 94 thus obtaining a final product.

Figure 14:
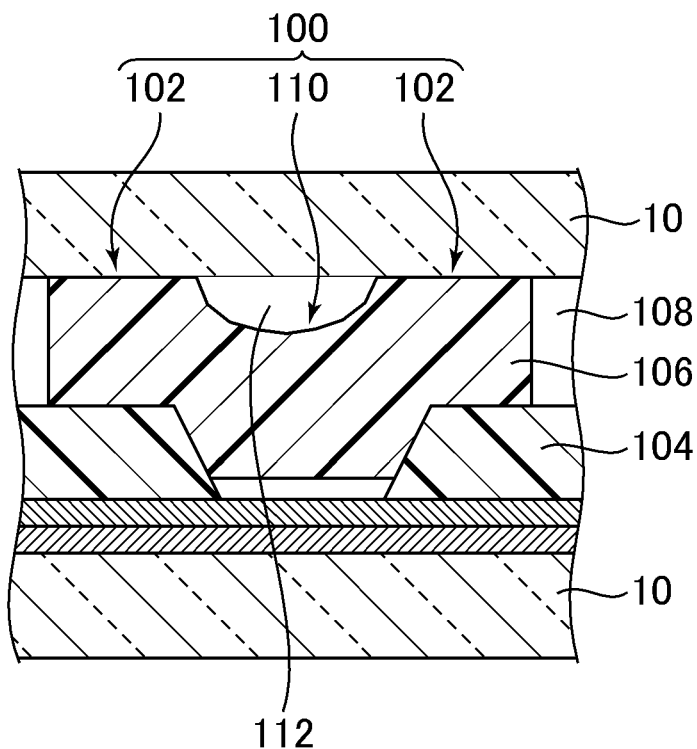
FIG. 14 is a view showing an intermediate product according to a modification 8 of the first embodiment.

FIG. 14 is a view showing an intermediate product according to a modification 8 of this embodiment. In this modification, an organic sealing member 100 includes a pair of full close contact portions 102 which is arranged in a spaced apart manner from each other in a state that the full close contact portions 102 are brought into close contact with both of the pair of inorganic substrates 10. In the modification shown in FIG. 14, each full close contact portion 102 is constituted of a part of an organic film 104 formed of at least one layer and an adhesive portion 106. The organic film 104 formed of at least one layer is brought into close contact with one inorganic substrate 10, the adhesive portion 106 is brought into close contact with the other inorganic substrate 10, and the organic film 104 and the adhesive portion 106 are brought into close contact with each other. The adhesive portion 106 is arranged adjacent to a sealed space 108. The organic sealing member 100 includes a half close contact portion 110 which is arranged between the pair of full close contact portions 102 and is brought into close contact with the other inorganic substrate 10 of the pair of inorganic substrates 10 while avoiding a contact with one inorganic substrate 10 of the pair of inorganic substrates 10. At least parts (for example, adhesive portions 106) of the respective full close contact portions 102 and the half close contact portion 110 are integrally formed, and the half close contact portion 110 is brought into close contact with a remaining part (for example, organic film 104 formed of at least one layer) of the full close contact portion 102. Between the pair of full close contact portions 102, a flow passage 112 is formed between the inorganic substrate 10 with which the half close contact portion 110 is not brought into contact and the half close contact portion 110. FIG. 14 is a view showing a cross section of the pair of full close contact portions 102 and the half close contact portion 110 in the direction orthogonal to the lengthwise direction.

Figure 15:
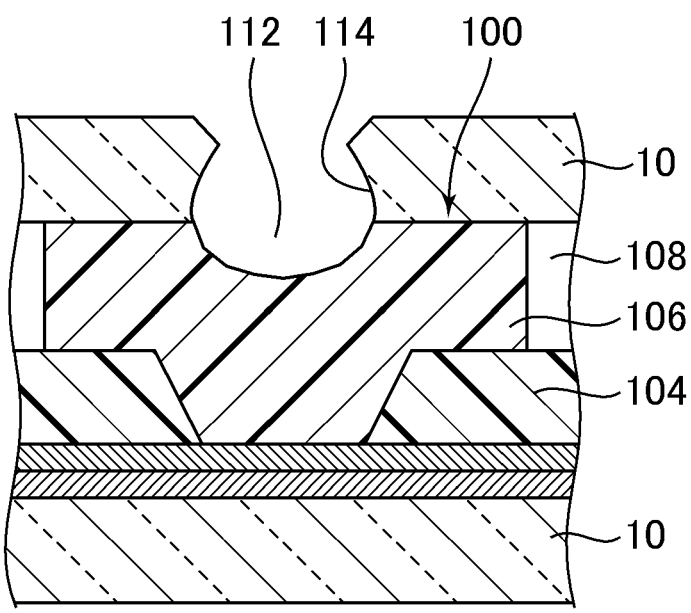
FIG. 15 is a view for explaining a method of manufacturing a display device using the intermediate product according to the modification 8.

FIG. 15 is a view for explaining a method of manufacturing a display device using the intermediate product according to the modification 8. A surface of one of the pair of inorganic substrates 10 is exposed in the flow passage 112 and hence, a groove 114 can be formed on the inorganic substrate 10 having such an exposed surface using an etchant. On the other hand, the other inorganic substrate 10 is covered with an organic sealing member 100 and hence, the inorganic substrate 10 is not exposed to the etchant so that a groove is not formed on the other inorganic substrate 10. In this manner, the groove 114 can be formed only on one of the pair of inorganic substrates 10. Further, the inorganic substrate 10 on which the groove 114 is formed is cut by scribing the inorganic substrate 10 from a surface opposite to the surface on which the groove 114 is formed. Other contents of this modification correspond to the contents explained in conjunction with the above-mentioned embodiment.

Figure 16:
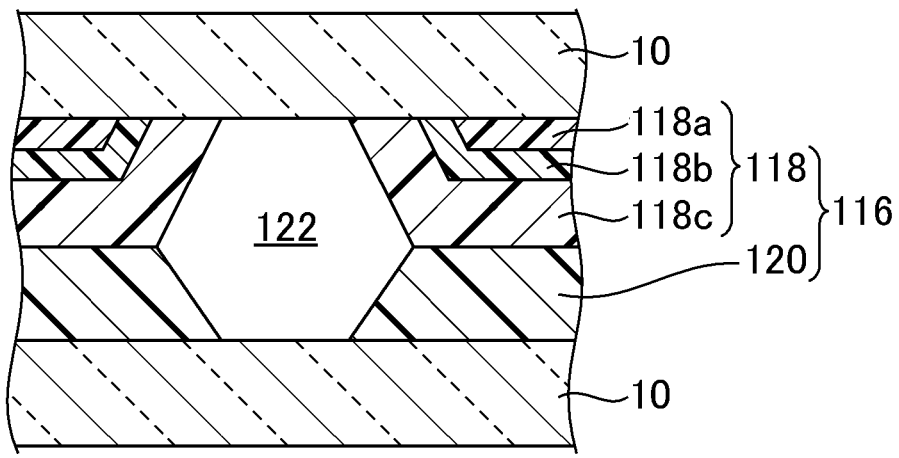
FIG. 16 is a view showing an intermediate product according to a modification 9 of the first embodiment.

FIG. 16 is a view showing an intermediate product according to a modification 9 of this embodiment. In this modification, an organic sealing member 116 includes a part of a first organic film 118 formed of at least one layer which is laminated to one inorganic substrate 10. In the modification shown in FIG. 16, the first organic film 118 includes a first organic film 118a which constitutes a black matrix arranged below the inorganic substrate 10 on an upper side, a first organic film 118b which constitutes an overcoat arranged below the first organic film 118a, and a first organic film 118c which constitutes a spacer for ensuring a distance between the pair of inorganic substrates 10. An organic sealing member 116 includes a part of a second organic film 120 formed of at least one layer which is laminated to the other inorganic substrate 10. A part of the first organic film 118 formed of at least one layer and a part of the second organic film 120 formed of at least one layer are bonded to each other (brought into close contact with each other, for example). Other contents of this modification correspond to the contents explained in conjunction with the above-mentioned embodiment (see FIG. 3 particularly).

Figure 17:
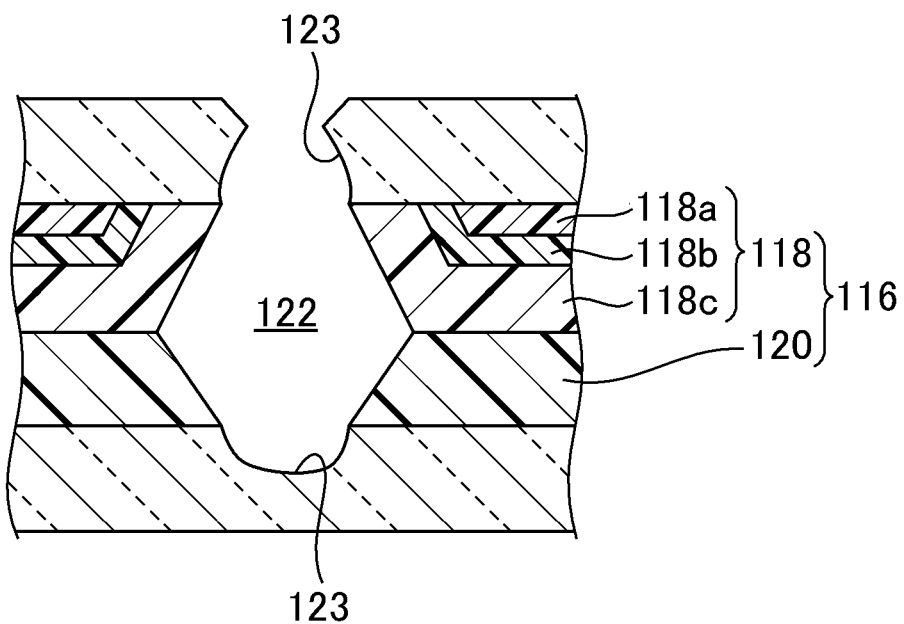
FIG. 17 is a view for explaining a method of manufacturing a display device using the intermediate product according to the modification 9.

FIG. 17 is a view for explaining a method of manufacturing a display device using the intermediate product according to the modification 9. Surfaces of both of the pair of inorganic substrates 10 are exposed to a flow passage 122 and hence, grooves 123 can be formed on both inorganic substrates 10 using an etchant. Further, FIG. 17 shows an example where only one inorganic substrate 10 is cut by scribing or the like, and the contents of this example are also applicable to the above-mentioned embodiment and other modifications. Other contents of this modification correspond to the contents explained in conjunction with the above-mentioned embodiment.

Figure 18:
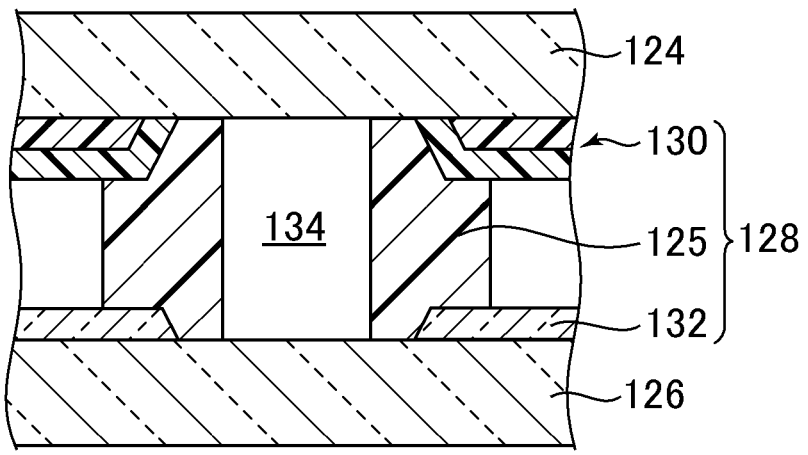
FIG. 18 is a view showing an intermediate product according to a modification 10 of the first embodiment.

FIG. 18 is a view showing an intermediate product according to a modification 10 of this embodiment. In this modification, a pair of inorganic substrates 124, 126 differs in thickness. An organic sealing member 128 includes a part of a first organic film 130 formed of at least one layer which is laminated to one inorganic substrate 124, a part of a second organic film 132 formed of at least one layer which is laminated to the other inorganic substrate 126, and an adhesive portion 125. The part of the first organic film 130 formed of at least one layer and the part of the second organic film 132 formed of at least one layer are bonded to each other by way of the adhesive portion 125. Other contents of this modification correspond to the contents explained in conjunction with the above-mentioned embodiment.

Figure 19:
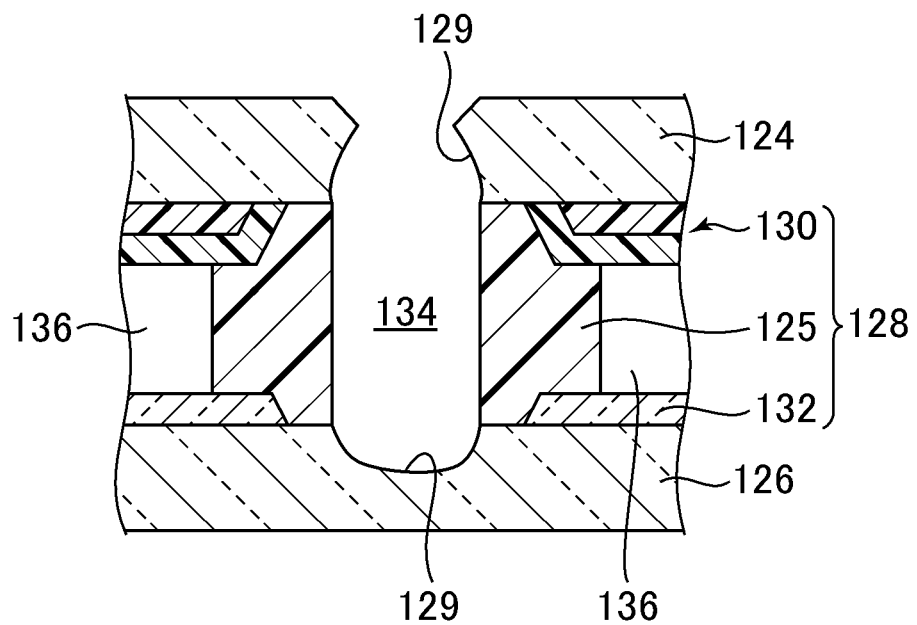
FIG. 19 is a view for explaining a method of manufacturing a display device using the intermediate product according to the modification 10.

FIG. 19 is a view for explaining a method of manufacturing a display device using the intermediate product according to the modification 10. Surfaces of both of the pair of inorganic substrates 124, 126 are exposed in a flow passage 134 and hence, grooves 129 can be formed on both inorganic substrates 124, 126 using an etchant. Also in this modification, outer surfaces of the inorganic substrates 124, 126 are etched by the etchant so that the inorganic substrates 124, 126 are made thin. Since the pair of inorganic substrates 124, 126 differs in thickness, etching of the outer surface of the inorganic substrate 124 having a smaller thickness is continued until the groove 129 penetrates the inorganic substrate 124. In the case where the groove 129 continuously surrounds a sealed space 136, the inorganic substrate 124 can be cut only by etching. On the other hand, although the groove 129 can be formed on the inorganic substrate 126 having a larger thickness, the groove 129 does not penetrate the inorganic substrate 126 and does not reach the outer surface and hence, the inorganic substrate 126 cannot be cut. Other contents of this modification correspond to the contents explained in conjunction with the above-mentioned embodiment.

Second Embodiment

Figure 20:
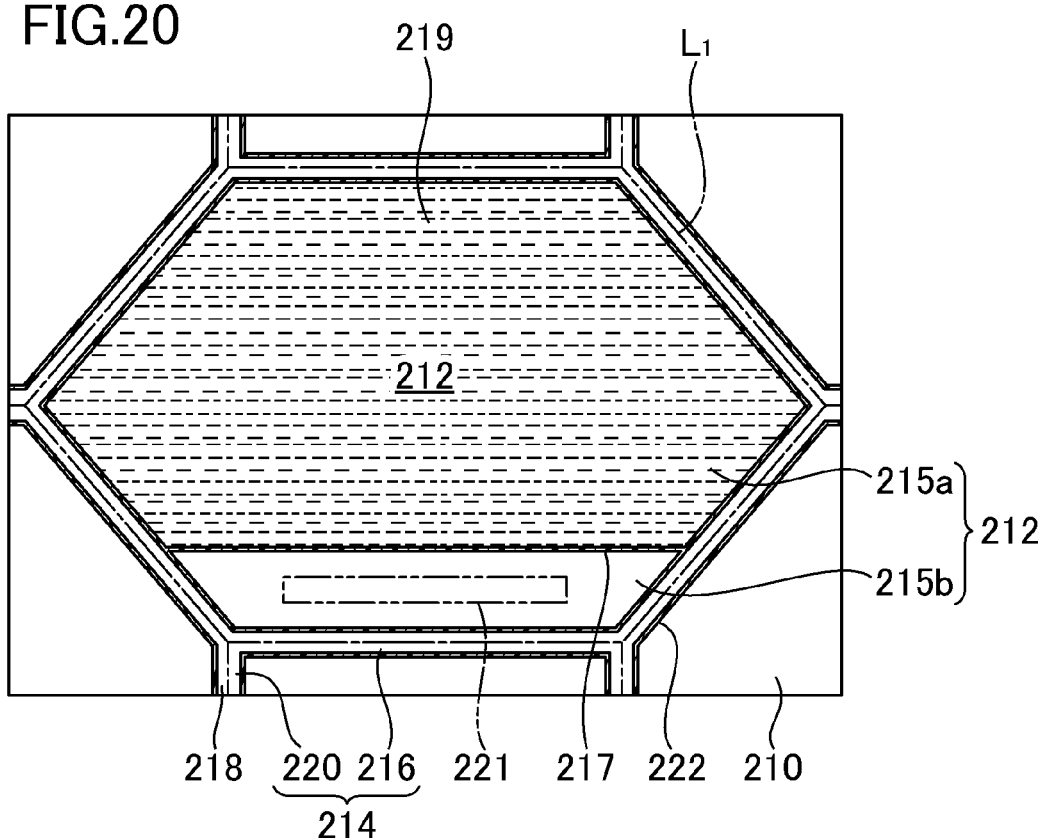
FIG. 20 is a view showing an intermediate product according to a second embodiment to which the present invention is applied.

FIG. 20 is a view showing an intermediate product according to a second embodiment to which the present invention is applied. In this modification, a first cutting line $L_1$ for inorganic substrates 210 is set so as to surround a polygonal shape such as a quadrangular shape or more. A sealed space 212 is positioned inside a polygonal region. A flow passage 214 is formed along the first cutting line $L_1$ as explained in the above-mentioned embodiment. The flow passage 214 includes an inner passage 216 which surrounds the sealed space 212, and external passages 220 which are branched from the inner passage 216 and are connected to openings 218. The inner passage 216 is formed so as to depict a polygonal shape, and the outer passages 220 extend from corner portions of the polygonal shape. The external passages 220 extend to a side of rectangular inorganic substrates 210 at a right angle.

An organic sealing member 222 includes a partition portion 217 which divides the sealed space 212 into plural divided sealed spaces 215a, 215b. The plural divided sealed spaces 215a, 215b are different in size. The larger divided sealed space 215a is filled with liquid crystal 219. The smaller divided sealed space 215b includes a region for mounting an integrated circuit chip 221 for driving liquid crystal 219, and a circuit not shown in the drawing for driving liquid crystal 219 is formed in the smaller divided sealed space 215b.

By allowing an etchant to flow in the flow passage 214 shown in FIG. 20, a groove is formed along the flow passage 214. Since the organic sealing member 222 is formed such that the flow passage 214 avoids the partition portion 217, a groove along the partition portion 217 is not formed. By forming the groove such that the groove penetrates the inorganic substrate 210, the inorganic substrate 210 can be cut out in a polygonal shape without scribing. To be more specific, by immersing an intermediate product in an etchant, outer surfaces of the pair of inorganic substrates 210 are etched so that a thickness of each inorganic substrate 210 is decreased whereby the groove formed on a surface opposite to the outer surface reaches the outer surface by penetration.

Figure 21:
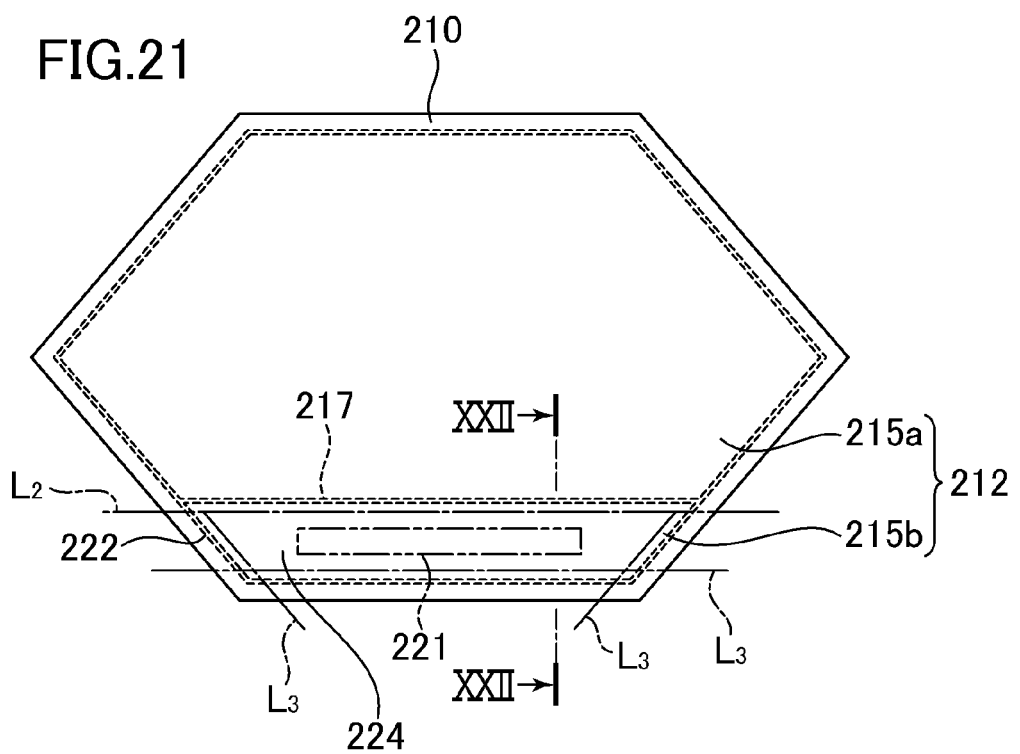
FIG. 21 is a view for explaining the intermediate product according to the second embodiment produced by cutting the inorganic substrates.
Figure 22:
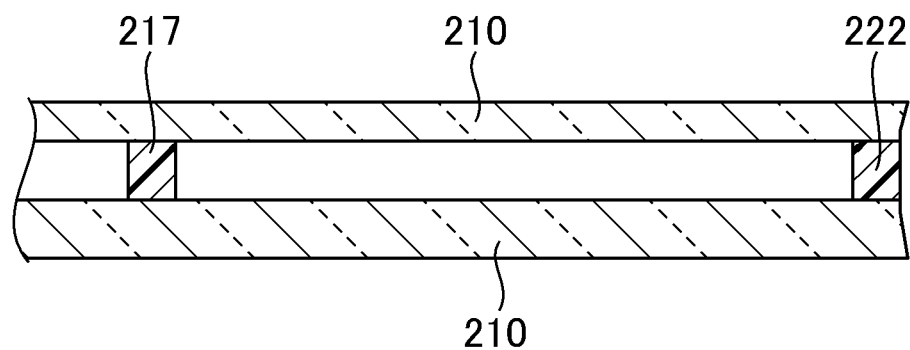
FIG. 22 is a cross-sectional view of the intermediate product shown in FIG. 21 taken along a line XXII-XXII.

FIG. 21 is a view for explaining the intermediate product produced by cutting the inorganic substrates 210. FIG. 22 is a cross-sectional view of the intermediate product shown in FIG. 21 taken along a line XXII-XXII. As shown in FIG. 21, the inorganic substrates 210 are cut in accordance with the above-mentioned process. Subsequently, one inorganic substrate 210 is cut along a second cut line $L_2$. The second cut line $L_2$ is set outside at least one of the plural divided sealed spaces 215a, 215b. For example, one inorganic substrate 210 is cut along the partition portion 217 outside the larger divided sealed space 215a (that is, on a smaller divided sealed space 215b side). This cutting is performed by applying a conventional method such as scribing. Due to such a process, a portion of one inorganic substrate 210 is formed as a cut piece 224 outside the partition portion 217. The cut piece 224 of one inorganic substrate 210 is fixed to the other inorganic substrate 210 by the organic sealing member 222. Further, to remove this organic sealing member 222, both inorganic substrates 210 are cut along third cutting lines $L_3$. This cutting is also performed by applying a conventional method such as scribing. Due to such a process, the cut piece 224 is removed.

Figure 23:
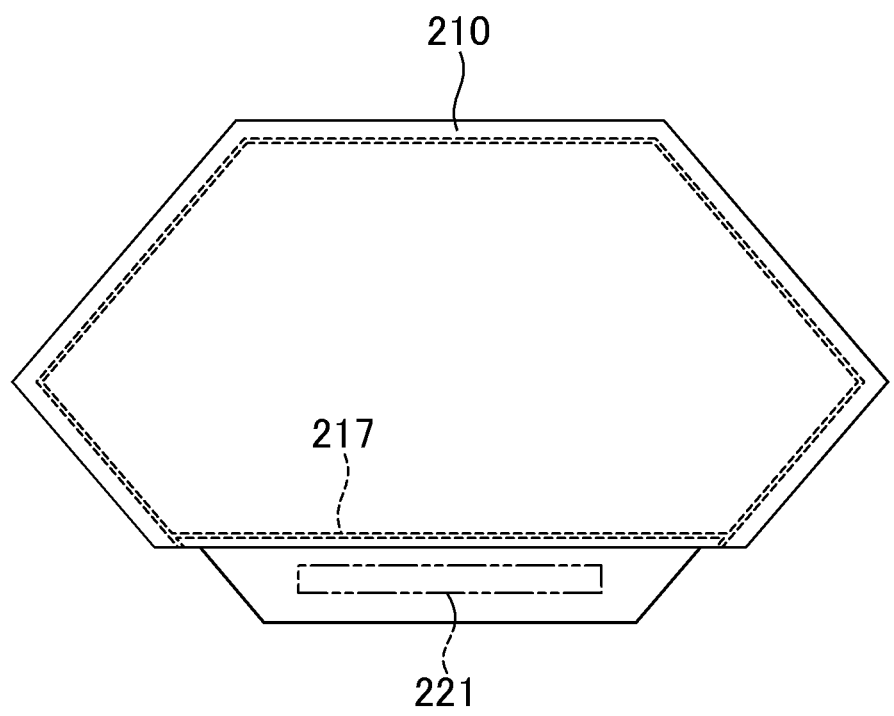
FIG. 23 is a view showing an intermediate product from which a cut piece is removed.

FIG. 23 is a view showing the intermediate product from which the cut piece 224 is removed. The region for mounting the integrated circuit chip 221 is exposed. By mounting the integrated circuit chip 221 in a succeeding step, a final product can be obtained. Provided that the cut piece 224 can be peeled off from the organic sealing member 222, cutting of both inorganic substrates 210 along the third cutting line $L_3$ may be omitted. The detail of other constitutions of this modification corresponds to the contents explained in conjunction with the above-mentioned embodiment.

Figure 24:
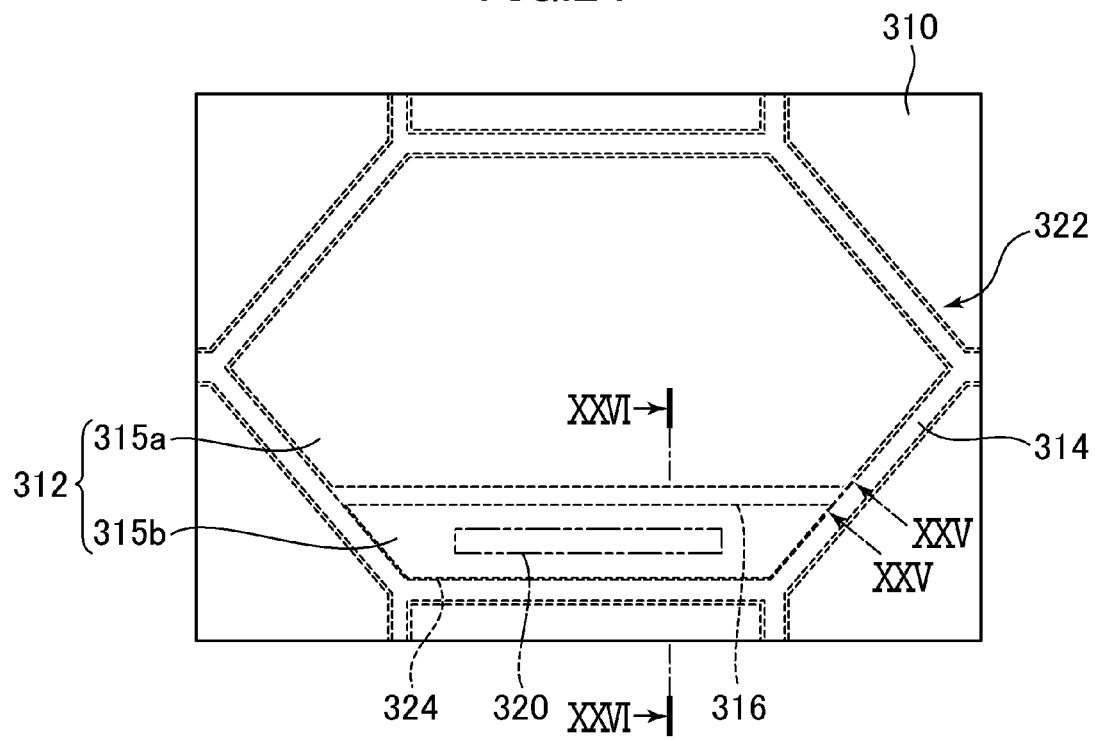
FIG. 24 is a view showing a modification of the intermediate product according to the second embodiment.
Figure 25:
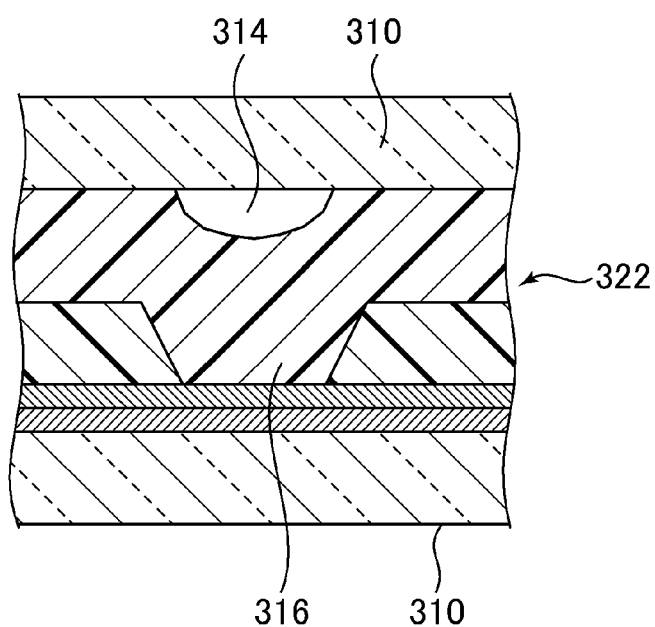
FIG. 25 is a cross-sectional view of the intermediate product shown in FIG. 24 taken along a line XXV-XXV.
Figure 26:
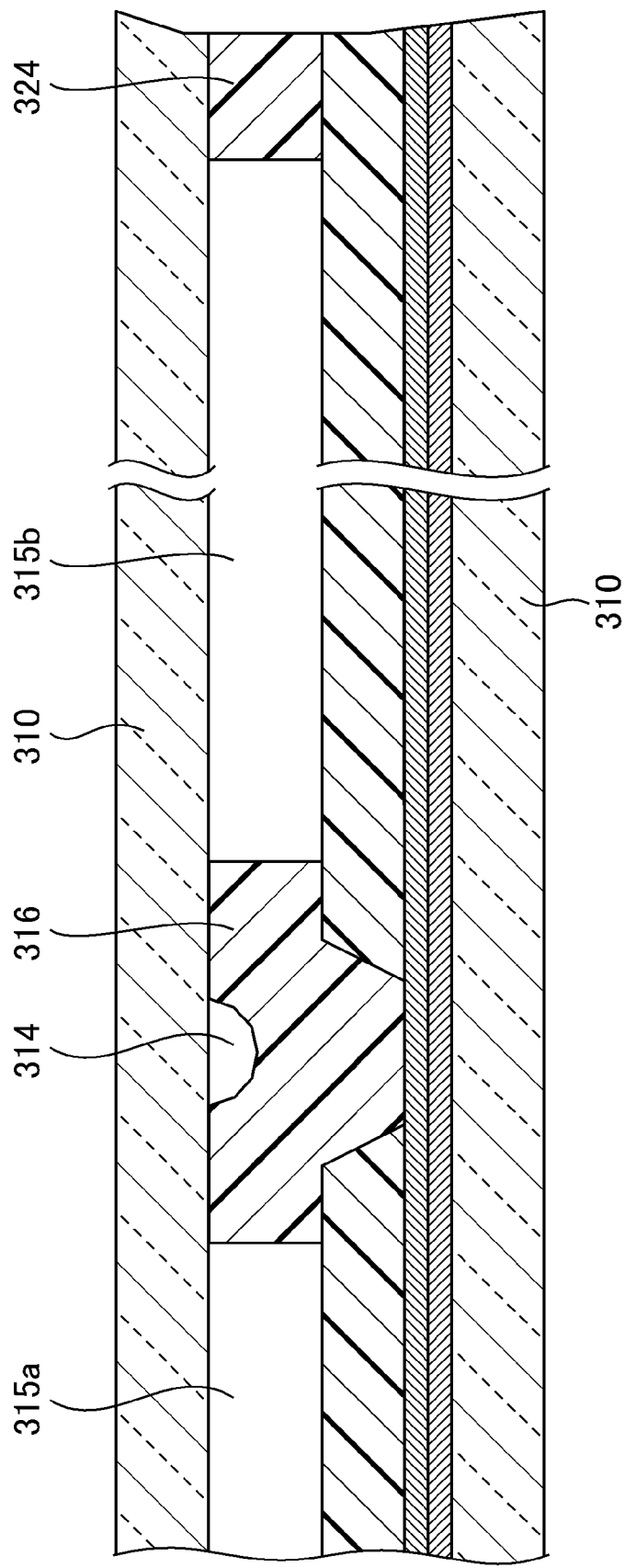
FIG. 26 is a cross-sectional view of the intermediate product shown in FIG. 24 taken along a line XXVI-XXVI.

FIG. 24 is a view showing a modification of the intermediate product according to the second embodiment. FIG. 25 is a cross-sectional view of the intermediate product shown in FIG. 24 taken along a line XXV-XXV. FIG. 26 is a cross-sectional view of the intermediate product shown in FIG. 24 taken along a line XXVI-XXVI. An organic sealing member 322 includes a partition portion 316. The intermediate product according to this modification differs from the intermediate product according to the above-mentioned second embodiment with respect to a point that a flow passage 314 passes the partition portion 316. In the partition portion 316, the flow passage 314 is defined by a surface of only one of a pair of inorganic substrates 310 and the organic sealing member 322. The detail of the partition portion 316 corresponds to the contents explained in conjunction with FIG. 20. In an area which surrounds the whole sealed space 312, the flow passage 314 is defined by surfaces of both of the pair of inorganic substrates 310 and the organic sealing member 322. Also in this modification, in the same manner as the above-mentioned second embodiment, the sealed space 312 is partitioned into plural divided sealed spaces 315a, 315b. Different from the second embodiment, with respect to the organic sealing member 322 which surrounds the sealed space 312, a portion 324 arranged adjacent to the smaller divided sealed space 315b (not containing the partition portion 316) has a width smaller than widths of other portions.

Figure 27:
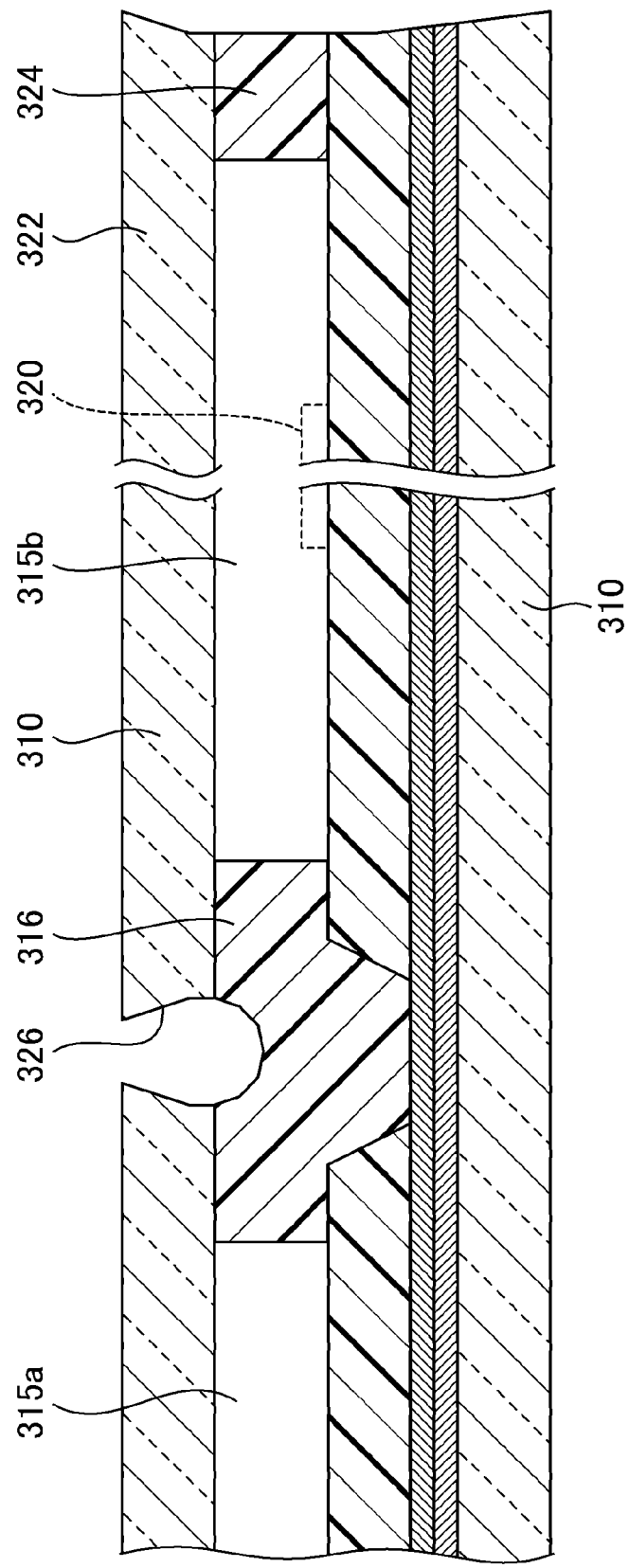
FIG. 27 is a view for explaining a method of manufacturing a display device according to a modification of the second embodiment.
Figure 28:
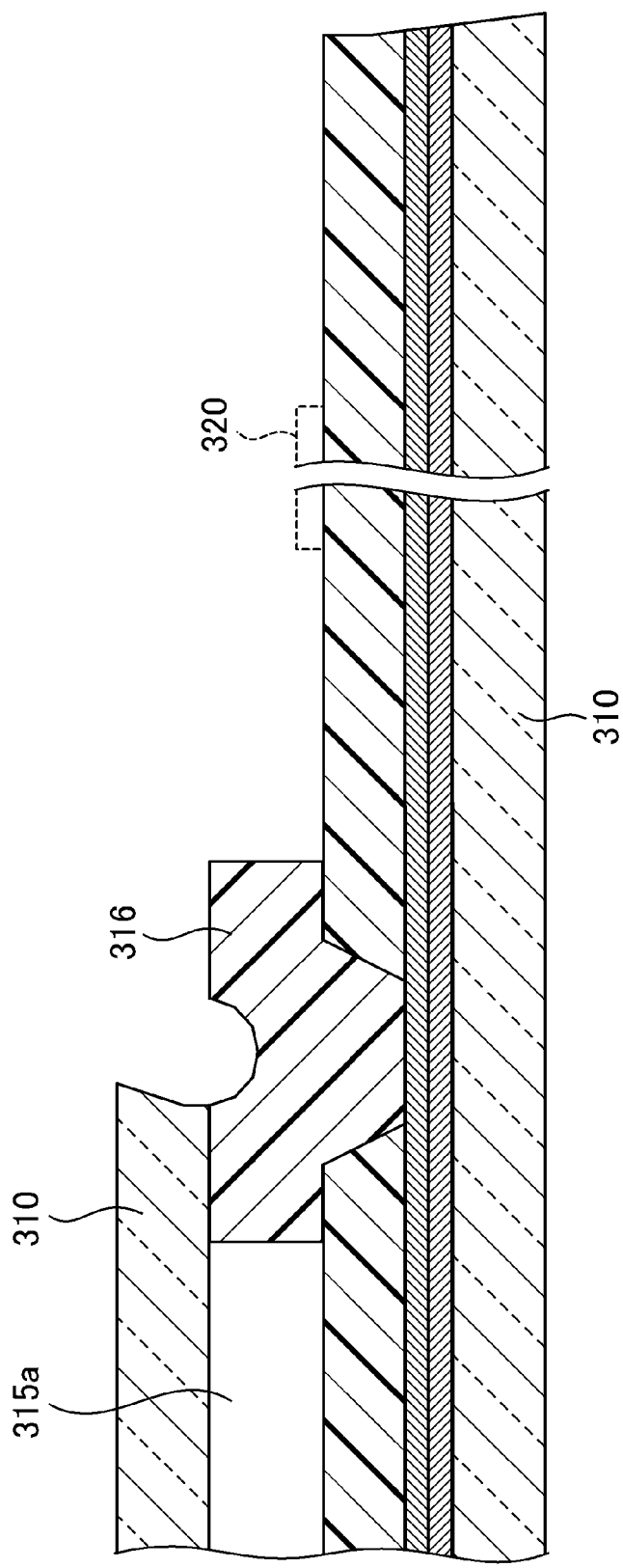
FIG. 28 is a view for explaining a method of manufacturing the display device according to the modification of the second embodiment.

FIG. 27 and FIG. 28 are views for explaining a method of manufacturing a display device according to a modification of the second embodiment. In this modification, as shown in FIG. 27, the flow passage 314 passes the partition portion 316 and hence, a groove 326 is formed on one inorganic substrate 310 which is exposed to the flow passage 314 by an etchant. In this modification, the groove 326 penetrates the inorganic substrate 310 and hence, the inorganic substrate 310 can be cut only by etching. To be more specific, by only performing etching, the pair of inorganic substrates 310 can be cut out in a polygonal planar shape, and also a portion of one inorganic substrate 310 can be cut. The detail of other constitutions is exactly the same as the corresponding constitutions of the above-mentioned second embodiment. In this manner, the pair of inorganic substrates 310 is cut such that the cutting line surrounds the sealed space 312. In the partition portion 316, only one inorganic substrate 310 is cut.

Although the cut piece 322 of one inorganic substrate 310 cut in the partition portion 316 is fixed to the other inorganic substrate 310 by the organic sealing member 322, a width of the organic sealing member 322 at such a portion 324 is made small as described above. Accordingly, peeling of the cut piece 322 can be easily performed. By peeling the cut piece 322, as shown in FIG. 28, the region for mounting the integrated circuit chip 320 can be exposed.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A method of manufacturing a display device, the method comprising:
   preparing an intermediate product where a pair of inorganic substrates which faces each other in an opposed manner is provided and a sealed space is formed by an organic sealing member between the pair of inorganic substrates; and
   cutting the pair of inorganic substrates outside the sealed space, wherein
   a circuit for an image display is formed on at least one of oppositely facing surfaces of the pair of inorganic substrates in the sealed space,
   the intermediate product includes a flow passage which is defined by a surface of at least one of the pair of inorganic substrates and the organic sealing member outside the sealed space, and
   the step of cutting the pair of inorganic substrates includes forming a groove by allowing an etchant for an inorganic material to flow into the flow passage and by etching the surface of at least one of the pair of inorganic substrates along the flow passage.

2. The method of manufacturing a display device according to claim 1, wherein the forming of the groove is performed by immersing the intermediate product in the etchant, and
   surfaces of the pair of inorganic substrates which are directed in the directions opposite to each other are etched by the etchant thus making the pair of inorganic substrates thin.

3. The method of manufacturing a display device according to claim 1, wherein a plurality of sealed spaces are formed by the organic sealing member.

4. The method of manufacturing a display device according to claim 1, wherein the organic sealing member is provided between the pair of inorganic substrates.

5. The method of manufacturing a display device according to claim 1, wherein the organic sealing member includes an interposed sealing member provided between the pair of inorganic substrates, and a cover sealing member which is provided on edge surfaces of the pair of inorganic substrates.

6. The method of manufacturing a display device according to claim 1, wherein the organic sealing member includes an inner sealing member arranged adjacent to the sealed space, and an outer sealing member which is arranged outside the sealed space surrounded by the inner sealing member and is separated from the inner sealing member in a spaced apart manner.

7. The method of manufacturing a display device according to claim 1, wherein the organic sealing member includes a pair of full close contact portions which is arranged in a spaced apart manner from each other such that the pair of full close contact portions is brought into close contact with both of the pair of inorganic substrates, and a half close contact portion which is arranged between the pair of full close contact portions and is brought into close contact with the other inorganic substrate of the pair of inorganic substrates while avoiding a contact with one inorganic substrate of the pair of inorganic substrates.

8. The method of manufacturing a display device according to claim 1, wherein the organic sealing member includes a portion of an organic film formed of at least one layer which is formed between the pair of inorganic substrates such that the organic film extends to an outer side from an inner side of the sealed space.

9. The method of manufacturing a display device according to claim 1, wherein the organic sealing member includes a portion of an organic film formed of at least one layer which is formed between the pair of inorganic substrates such that the organic film extends to an outer side from an inner side of the sealed space, and an adhesive portion which is laminated to the portion of the organic film formed of at least one layer and adheres the pair of inorganic substrates to each other.

10. The method of manufacturing a display device according to claim 1, wherein the organic sealing member includes a portion of a first organic film formed of at least one layer which is laminated to one inorganic substrate, and a portion of a second organic film formed of at least one layer which is laminated to the other inorganic substrate, and
    the portion of the first organic film formed of at least one layer and the portion of the second organic film formed of at least one layer are bonded to each other.

11. The method of manufacturing a display device according to claim 1, wherein the organic sealing member includes a portion of a first organic film formed of at least one layer which is laminated to one inorganic substrate, a portion of a second organic film formed of at least one layer which is laminated to the other inorganic substrate, and an adhesive portion, and
    the portion of the first organic film formed of at least one layer and the portion of the second organic film formed of at least one layer are bonded to each other by way of the adhesive portion.

12. The method of manufacturing a display device according to claim 1, wherein in the step of cutting the pair of inorganic substrates, a surface of the inorganic substrate opposite to the surface on which the groove is formed is scribed along the groove.

13. The method of manufacturing a display device according to claim 1, wherein a slit is formed in at least one of the pair of inorganic substrates in a penetrating manner by advancing the growth of the groove by the etching.

14. The method of manufacturing a display device according to claim 13, wherein at least one of the pair of inorganic substrates is cut by forming the slit such that the slit surrounds the sealed space.

15. The method of manufacturing a display device according to claim 14, wherein both of the pair of inorganic substrates are cut by the etching.

16. The method of manufacturing a display device according to claim 1, wherein a product sealing member which surrounds a space to be formed into a product is provided in the sealed space between the pair of inorganic substrates, and
    the circuit is arranged in the space to be formed into the product.

17. The method of manufacturing a display device according to claim 16, wherein in the space formed into the product, liquid crystal is sealed by the product sealing member.

18. The method of manufacturing a display device according to claim 16, wherein an opening for filling liquid crystal into the space to be formed into the product is formed in the product sealing member.

19. The method of manufacturing a display device according to claim 1, wherein the sealed space is filled with liquid crystal.

20. The method of manufacturing a display device according to claim 1, wherein the organic sealing member includes a partition portion which divides the sealed space into a plurality of divided sealed spaces.

21. The method of manufacturing a display device according to claim 20, wherein the organic sealing member is formed in a state where the flow passage avoids the partition portion.

22. The method of manufacturing a display device according to claim 20, wherein the organic sealing member is formed in a state where the flow passage passes the partition portion.

23. The method of manufacturing a display device according to claim 22, wherein in the partition portion, the flow passage is formed such that the flow passage is defined by the surface of only one of the pair of inorganic substrates and the organic sealing member, and in an area which surrounds the whole sealed space, the flow passage is defined by the surfaces of both of the pair of inorganic substrates and the organic sealing member.

* * * * *